(12) United States Patent
Moon et al.

(10) Patent No.: US 12,256,066 B2
(45) Date of Patent: Mar. 18, 2025

(54) METHOD AND APPARATUS FOR ENCODING/DECODING VIDEO SIGNAL

(71) Applicant: Intellectual Discovery Co., Ltd., Seoul (KR)

(72) Inventors: Joo Hee Moon, Seoul (KR); Sung Won Lim, Seoul (KR); Dong Jae Won, Goyang-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 16/096,845

(22) PCT Filed: Apr. 28, 2017

(86) PCT No.: PCT/KR2017/004571
§ 371 (c)(1),
(2) Date: Oct. 26, 2018

(87) PCT Pub. No.: WO2017/188780
PCT Pub. Date: Nov. 2, 2017

(65) Prior Publication Data
US 2019/0141319 A1    May 9, 2019

(30) Foreign Application Priority Data

Apr. 29, 2016 (KR) .................... 10-2016-0052704
Apr. 29, 2016 (KR) .................... 10-2016-0052932

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/119* (2014.11);
(Continued)

(58) Field of Classification Search
CPC .... H04N 19/11; H04N 19/119; H04N 19/176; H04N 19/159; H04N 19/105
See application file for complete search history.

(56) References Cited

U.S. PATENT DOCUMENTS 10,341,655 B2 *   7/2019   Sunwoo ............... H04N 19/147
10,917,639 B2 *   2/2021   Jang .................... H04N 19/176
(Continued)

FOREIGN PATENT DOCUMENTS

CN    103491380 A    1/2014
JP    2007-67469 A   3/2007
(Continued)

OTHER PUBLICATIONS

International Search Report issued on Aug. 9, 2017 in corresponding International Patent Application No. PCT/KR2017/004571 (2 pages in English and 3 pages in Korean).
(Continued)

*Primary Examiner* — Shawn S An
(74) *Attorney, Agent, or Firm* — BROADVIEW IP LAW, PC

(57) ABSTRACT

According to the present invention, a method of decoding a video signal may include decoding division information that indicates whether a current decoding block is divided into two partial blocks, decoding information that indicates a division direction for the current decoding block when the division information indicates that the current decoding block is divided into the two partial blocks, and dividing the current decoding block into the two partial blocks according to the division direction.

5 Claims, 27 Drawing Sheets

(51) Int. Cl.
  *H04N 19/119* (2014.01)
  *H04N 19/159* (2014.01)
  *H04N 19/176* (2014.01)
  *H04N 19/463* (2014.01)
(52) U.S. Cl.
  CPC ......... *H04N 19/159* (2014.11); *H04N 19/176* (2014.11); *H04N 19/463* (2014.11)

(56) References Cited

U.S. PATENT DOCUMENTS

| | | | |
|---|---|---|---|
| 2007/0140337 A1* | 6/2007 | Lim | H04N 19/61 375/E7.176 |
| 2008/0247464 A1 | 10/2008 | Seregin et al. | |
| 2009/0168878 A1* | 7/2009 | Kawashima | H04N 19/117 375/240.13 |
| 2010/0034268 A1* | 2/2010 | Kusakabe | H04N 19/11 375/240.15 |
| 2010/0150394 A1* | 6/2010 | Bloom | H04N 19/93 382/100 |
| 2010/0246665 A1* | 9/2010 | Brederson | H04N 19/436 375/240.01 |
| 2011/0038414 A1 | 2/2011 | Song et al. | |
| 2011/0286520 A1* | 11/2011 | Xu | H04N 19/147 375/240.12 |
| 2012/0082224 A1* | 4/2012 | Van Der Auwera | H04N 19/85 375/240.12 |
| 2012/0106633 A1* | 5/2012 | Kim | H04N 19/122 375/E7.243 |
| 2012/0307894 A1* | 12/2012 | Chien | H04N 19/176 375/E7.243 |
| 2013/0003856 A1* | 1/2013 | Saxena | H04N 19/12 375/240.18 |
| 2013/0051468 A1* | 2/2013 | Tao | H04N 19/61 375/240.13 |
| 2013/0070848 A1* | 3/2013 | Guo | H04N 19/176 375/E7.243 |
| 2013/0107949 A1* | 5/2013 | Sim | H04N 19/11 375/E7.243 |
| 2013/0121401 A1 | 5/2013 | Zheludkov et al. | |
| 2013/0128966 A1* | 5/2013 | Gao | H04N 19/129 375/240.12 |
| 2013/0243091 A1* | 9/2013 | Ye | H04N 19/124 375/240.16 |
| 2014/0133558 A1* | 5/2014 | Seregin | H04N 19/109 375/240.12 |
| 2015/0023405 A1* | 1/2015 | Joshi | H04N 19/117 375/240.02 |
| 2015/0124876 A1* | 5/2015 | Lee | H04N 19/176 375/240.12 |
| 2015/0288980 A1* | 10/2015 | Lee | H04N 19/52 375/240.16 |
| 2015/0358621 A1* | 12/2015 | He | H04N 19/176 375/240.02 |
| 2016/0286232 A1* | 9/2016 | Li | H04N 19/57 |
| 2017/0094314 A1* | 3/2017 | Zhao | H04N 19/625 |
| 2019/0052876 A1* | 2/2019 | Lee | H04N 19/157 |
| 2019/0141319 A1* | 5/2019 | Moon | H04N 19/176 |

FOREIGN PATENT DOCUMENTS

| | | |
|---|---|---|
| KR | 10-2011-0117075 A | 10/2011 |
| KR | 10-2012-0003406 A | 1/2012 |
| KR | 10-2015-0038296 A | 4/2015 |
| KR | 10-2015-0113524 A | 10/2015 |
| KR | 10-2015-0141177 A | 12/2015 |
| WO | 2012/093969 A1 | 7/2012 |
| WO | WO 2014/047881 A | 4/2014 |

OTHER PUBLICATIONS

Kang, Min-Koo et al., "Depth Video Coding Using Adaptive Geometry Based Intra Prediction for 3-D Video Systems", *IEEE Transactions on Multimedia*, vol. 14, Issue 1, Feb. 2012 (pp. 121-128).

Kim, Il-Koo et al., "Block Partitioning Structure in the HEVC Standard", *IEEE Transactions on Circuits and Systems for Video Technology*, vol. 22, Issue 12, Dec. 2012 (pp. 1697-1706).

Ahn, Sangsoo et al., "A Novel Fast CU Encoding Scheme Based on Spatiotemporal Encoding Parameters for HEVC Inter Coding", *IEEE Transactions on Circuits and Systems for Video Technology*, Mar. 2015 (pp. 422-435).

An, Jicheng et al., "Quadtree plus binary tree structure integration with JEM tools", *Joint Video Exploration Team (JVET) of ITU-T SG 16 WP 3 and ISO/IEC JTC 1/SC 29/WG 11*, 2nd Meeting: San Diego, United States of America, Feb. 20-26, 2016 (10 pages in English).

Seregin et al., "Block shape dependent intra mode coding", Joint Video Exploration Team (JVET) of ITU-T SG 16 WP 3 and ISO/IEC JTC 1/SC 29/WG 11, JVET-D0114, Oct. 15-21, 2016, pp. 1-3.

Zhang et al., "Results for Non-Square Intra Prediction with NSQ", Working draft modification for JCTVC-10224, Draft ISO/IEC 23008-HEVC:201x (E), 2012, pp. 1-16.

Liu et al., "Rectangular Partitioning for Intra Prediction in HEVC", Visual Communications and Image Processing, IEEE, Nov. 27, 2012, 6 pages.

Cao et al., "Short Distance Intra Coding Scheme for HEVC", 2012 Picture Coding Symposium, May 7-9, 2012, pp. 501-504.

* cited by examiner

FIG. 18

| Condition | | | MPM Candidate 1 | MPM Candidate 1 | MPM Candidate 1 |
|---|---|---|---|---|---|
| L = A | L = Angle prediction mode | | L or L' | L-1 or (L-1)' | L+1 or (L+1)' |
| | Others | | Planar | DC | Vertical |
| L ≠ A | L ≠ Planar Mode && A ≠ Planar Mode | | L or L' | A or A' | Planar |
| | Others | L ≠ DC Mode && A ≠ DC Mode | L or L' | A or A' | DC |
| | | Others | L or L' | A or A' | Vertical |

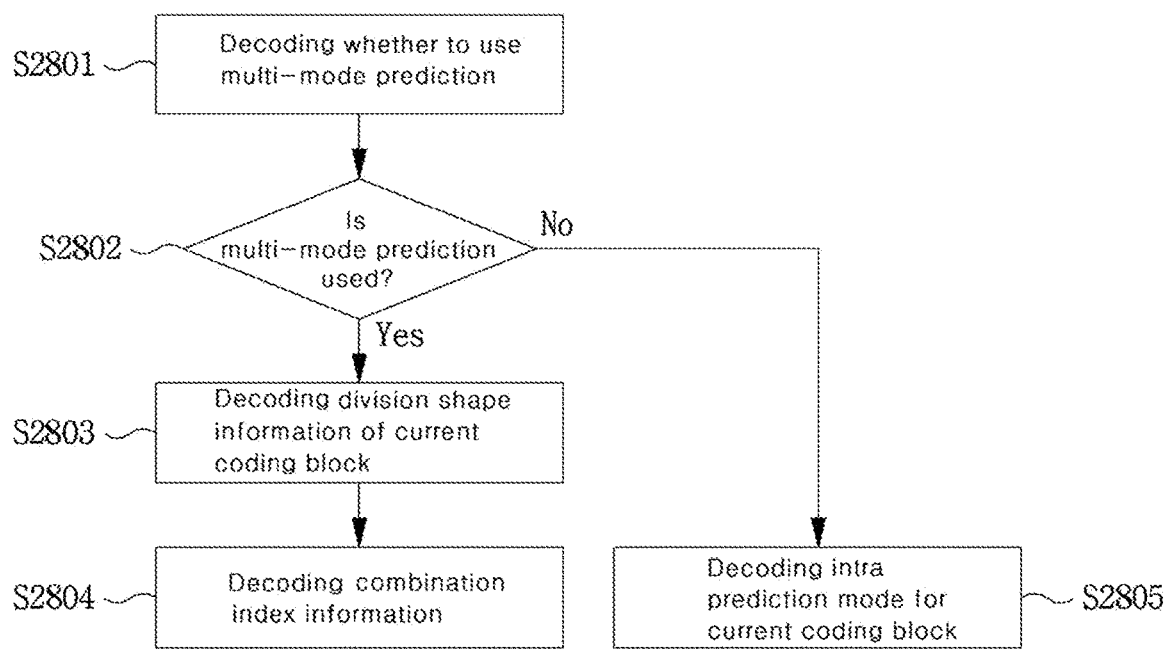

METHOD AND APPARATUS FOR ENCODING/DECODING VIDEO SIGNAL

CROSS REFERENCE TO RELATED APPLICATIONS

This application is a U.S. national stage application of International Application No. PCT/KR2017/004571 filed on Apr. 28, 2017, which claims the benefit of Korean Patent Application No. 10-2016-0052704 filed on Apr. 29, 2016 and Korean Patent Application No. 10-2016-0052932 filed on Apr. 29, 2016, in the Korean Intellectual Property Office, the entire disclosures of which are incorporated by reference for all purposes.

TECHNICAL FIELD

The present invention relates to a method and apparatus for encoding/decoding a video signal

BACKGROUND ART

Recently, demands for multimedia data, such as a video, over the Internet, have rapidly increased. However, it is difficult for the speed at which bandwidths of channels operate to follow the rapidly increasing amount of multimedia data.

DISCLOSURE

Technical Problem

In encoding/decoding an image, the present invention is intended to enhance compression efficiency of an image by efficiently encoding/decoding a division method of an encoding/decoding target block.

In encoding/decoding an image, the present invention is intended to enhance compression efficiency of an image by efficiently encoding/decoding intra prediction mode information of an encoding/decoding target block.

In encoding/decoding an image, the present invention is intended to enhance compression efficiency of an image by using multiple intra prediction modes.

Technical Solution

According to the present invention, provided is a method and apparatus for decoding a video signal, the method including: decoding division information that indicates whether a current decoding block is divided into two partial blocks; decoding information that indicates a division direction for the current decoding block, when the division information indicates that the current decoding block is divided into the two partial blocks; and dividing the current decoding block into the two partial blocks according to the division direction. Here, the division information includes at least one among SBT division information, which indicates whether the current decoding block is divided into the two partial blocks in a symmetrical shape, and ASBT division information, which indicates whether the current decoding block is divided into the two partial blocks in an asymmetrical shape.

In the method and apparatus for decoding the video signal according to the present invention, the division direction may indicate one of a horizontal direction and a vertical direction.

In the method and apparatus for decoding the video signal according to the present invention, the method may further include: determining most probable mode (MPM) candidates for the current decoding block on the basis of intra prediction modes of neighboring blocks close to the current decoding block; decoding information that indicates whether there is the MPM candidate the same as an intra prediction mode of the current decoding block; and deriving the intra prediction mode of the current decoding block according to the information.

In the method and apparatus for decoding the video signal according to the present invention, the number of intra prediction modes available for the current decoding block may be variably determined according to a size, a shape of the current decoding block, or the intra prediction modes of the neighboring blocks.

In the method and apparatus for decoding the video signal according to the present invention, the MPM candidates may be determined according to use frequency of the intra prediction modes of the neighboring blocks.

In the method and apparatus for decoding the video signal according to the present invention, when the number of intra prediction modes available for the current decoding block is different from the number of intra prediction modes available for the neighboring blocks, the MPM candidates may indicate angles of the intra prediction modes.

According to the present invention, provided is a method and apparatus for decoding a video signal, the method including: decoding information that indicates whether multiple intra prediction modes are used for a current decoding block; decoding information that indicates a division shape for the current decoding block, when determining that the multiple intra prediction modes are used; and decoding information on intra prediction modes of partial blocks included in the current decoding block.

In the method and apparatus for decoding the video signal according to the present invention, the information on the intra prediction modes of the partial blocks may include combination index information indicating a combination of the intra prediction modes of the partial blocks.

In the method and apparatus for decoding the video signal according to the present invention, the current decoding block may be divided on the basis of a division line that is a straight line or a diagonal line.

According to the present invention, provided is a method and apparatus for encoding a video signal, the method including: encoding division information that indicates whether a current coding block is divided into two partial blocks; and encoding information that indicates a division direction for the current coding block, when the division information indicates that the current coding block is divided into two partial blocks. Here, the division information includes at least one among SBT division information, which indicates whether the current coding block is divided into the two partial blocks in a symmetrical shape, and ASBT division information, which indicates whether the current coding block is divided into the two partial blocks in an asymmetrical shape.

In the method and apparatus for encoding the video signal according to the present invention, the division direction may indicate one of a horizontal direction and a vertical direction.

In the method and apparatus for encoding the video signal according to the present invention, the method may further include: determining most probable mode (MPM) candidates for the current coding block on the basis of intra prediction modes of neighboring blocks close to the current coding block; determining whether an intra prediction mode of the current coding block is the same as the MPM candidate; and encoding information that indicates whether there is the MPM candidate the same as the intra prediction mode of the current coding block.

In the method and apparatus for encoding the video signal according to the present invention, determining most probable mode (MPM) candidates for the current coding block on the basis of intra prediction modes of neighboring blocks close to the current coding block; determining whether an intra prediction mode of the current coding block is the same as the MPM candidate; and encoding information that indicates whether there is the MPM candidate the same as the intra prediction mode of the current coding block.

In the method and apparatus for encoding the video signal according to the present invention, the MPM candidates may be determined according to use frequency of the intra prediction modes of the neighboring blocks.

In the method and apparatus for encoding the video signal according to the present invention, when the current coding block is different from the number of intra prediction modes available for the neighboring blocks, the MPM candidates may indicate angles of the intra prediction modes.

According to the present invention, provided is a method and apparatus for encoding a video signal, the method including: encoding information that indicates whether multiple intra prediction modes are used for a current coding block; encoding information that indicates a division shape for the current coding block, when determining that the multiple intra prediction modes are used; and encoding information on intra prediction modes of partial blocks included in the current coding block.

In the method and apparatus for encoding the video signal according to the present invention, the information on the intra prediction modes of the partial blocks may include combination index information indicating a combination of the intra prediction modes of the partial blocks.

In the method and apparatus for encoding the video signal according to the present invention the current coding block may be divided on the basis of a division line that is a straight line or a diagonal line.

Advantageous Effects

According the present invention, compression efficiency of an image may be enhanced by efficiently encoding/decoding a division method of an encoding/decoding target block.

According the present invention, compression efficiency of an image may be enhanced by efficiently encoding/decoding intra prediction mode information of an encoding/decoding target block.

According the present invention, compression efficiency of an image may be enhanced by using multiple intra prediction modes.

DESCRIPTION OF DRAWINGS

FIG. 18 is a diagram illustrating an example of setting MPM candidates.

FIG. 27 is a diagram illustrating an example of generating combined index information.

FIG. 28 is a flowchart illustrating a method of decoding multiple intra prediction modes for a current coding block.

MODE FOR INVENTION

Figure 1:
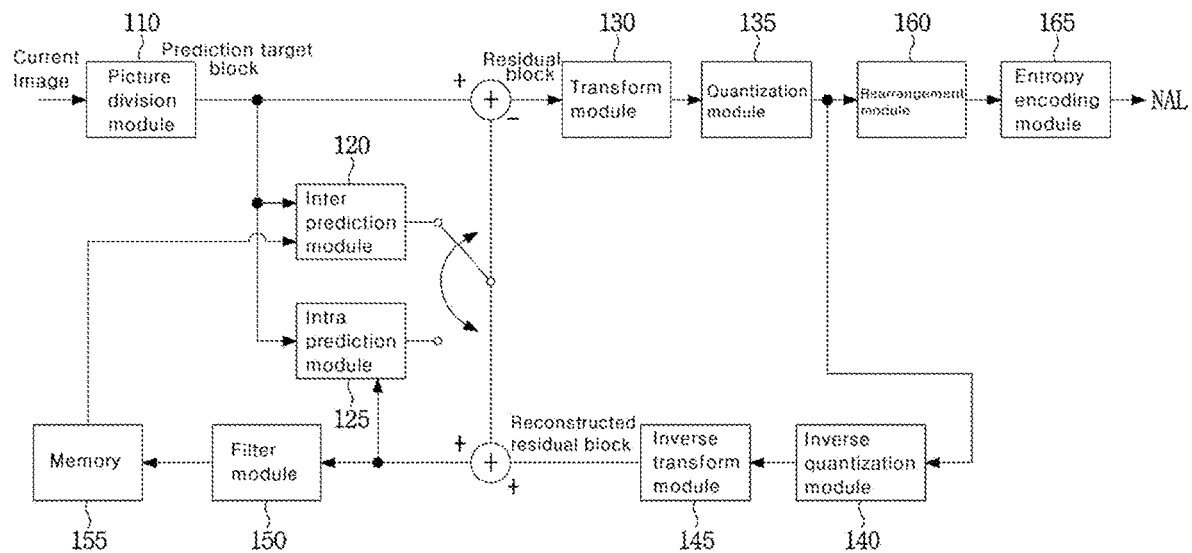
FIG. 1 is a block diagram illustrating an apparatus for encoding an image according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, "first", "second", etc. can be used to describe various elements, but the elements are not to be construed as being limited to the terms. The terms are only used to differentiate one element from other elements. For example, the "first" element may be named the "second" element without departing from the scope of the present invention, and the "second" element may also be similarly named the "first" element. The term "and/or" includes a combination of a plurality of items or any one of a plurality of terms.

It will be understood that when an element is simply referred to as being "connected to" or "coupled to" another element without being "directly connected to" or "directly coupled to" another element in the present description, it may be "directly connected to" or "directly coupled to" another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same elements in the drawings are denoted by the same reference numerals, and a repeated description of the same elements will be omitted.

FIG. 1 is a block diagram illustrating an apparatus for encoding an image according to an embodiment of the present invention.

Referring to FIG. 1, an apparatus 100 for encoding an image may include a picture division module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constituents shown in FIG. 1 are independently shown so as to represent characteristic functions different from each other in the apparatus for encoding the image. Thus, it does not mean that each constituent is constituted in a constituent unit of separated hardware or software. In other words, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constituents for implementing the essence of the present invention except the constituents used in improving performance. The structure including only the indispensable constituents except the selective constituents used in improving only performance is also included in the scope of the present invention.

The picture division module 110 may divide an input picture into one or more blocks. Here, the block may mean a coding unit (CU), a prediction unit (PU), or a transform unit (TU). Division may be performed on the basis of a quad tree or a binary tree or both. The quad tree is a method of dividing an upper-layer block into four lower-layer blocks each of which the width and the height are half of the upper-layer block. The binary tree is a method of dividing an upper-layer block into two lower-layer blocks each of which the width or the height is half of the upper-layer block. Through division based on the binary tree, the block may be in square or non-square shapes.

Hereinafter, in the embodiment of the present invention, the coding unit may mean a unit of performing encoding or a unit of performing decoding.

The prediction modules 120 and 125 may include an inter prediction module 120 performing inter prediction and an intra prediction module 125 performing intra prediction. Whether to perform inter prediction or intra prediction for the prediction may be determined, and detailed information (for example, an intra prediction mode, a motion vector, a reference picture, and the like) according to each prediction method may be determined. Here, the processing unit subjected to prediction may be different from the processing unit in which the prediction method and the detailed content are determined. For example, the prediction method, the prediction mode, and the like may be determined by the prediction unit, and prediction may be performed by the transform unit.

The apparatus for encoding may determine the optimum prediction mode for the coding block by using various techniques such as rate-distortion optimization (RDO) for residual blocks without the original block and the prediction block, and the like. For example, RDO may be determined by Equation 1 below.

$$J=(\Phi,\lambda)=D(\Phi)+\lambda R(\Phi) \qquad \text{[Equation 1]}$$

In Equation 1, D denotes deterioration due to quantization, R denotes a rate of a compression stream, and J denotes RD cost. Also, $\Phi$ denotes an encoding mode, and $\lambda$ denotes a Lagrangian multiplier. A may be used as a scale correction coefficient for matching units between the amount of error and the amount of bits. In the encoding process, the apparatus for encoding may determine a mode in which an RD cost value is the minimum value, as the optimum mode for the coding block. Here, the RD-cost value is determined by simultaneously taking the bitrate and the error into consideration.

Figure 3:
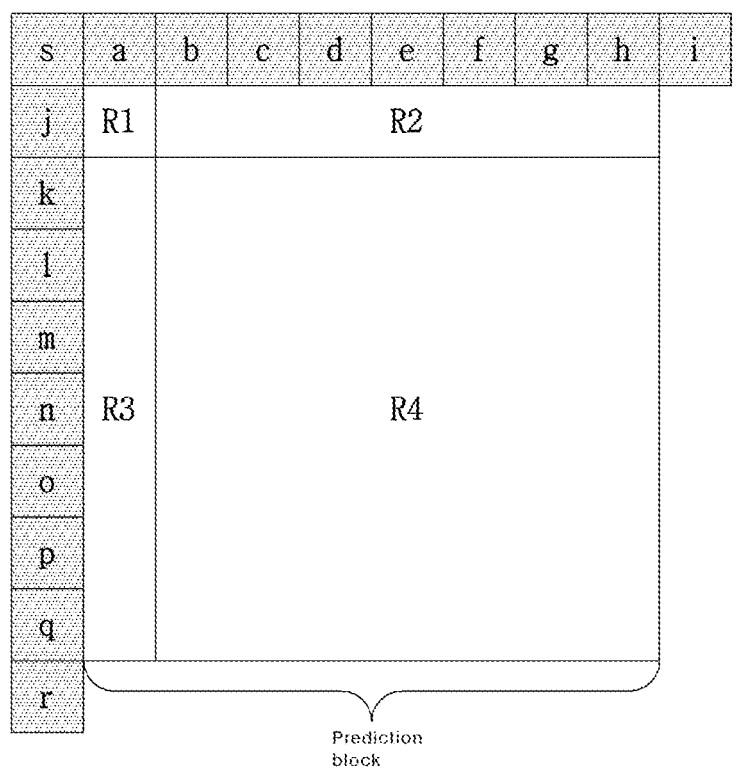
FIG. 3 is a diagram illustrating an intra prediction method using a DC mode.

Among intra modes, a DC mode, which is a non-directional prediction mode (or a non-angular prediction mode), uses an average value of neighboring pixels of the current block. FIG. 3 is a diagram illustrating an intra prediction method using a DC mode.

After filling the prediction block with the average value of the neighboring pixels, filtering may be performed on the pixels positioned on the boundaries of the prediction block. For example, weighted sum filtering with neighboring reference pixels may be applied to the pixels positioned on the left or top boundary of the prediction block. For example, Equation 2 is an example of generating prediction pixels through a DC mode for each section. In Equation 1 below, regions R1, R2, and R3 are regions positioned on the outermost (namely, the boundary) of the prediction block, and weighted sum filtering may be applied to the pixels included in the regions.

$$\text{DC value} = \frac{\left(\sum_{x=0}^{Wid-1} R[x][-1] + \sum_{y=0}^{Hei-1} R[-1][y] + ((Wid + Hei) >> 1)\right)}{(Wid + Hei)}$$ [Equation 2]

Region R1)

$$Pred[0][0] = (R[-1][0] + 2*\text{DC value} + R[0][-1] + 2) >> 2$$

Region R2)

$$Pred[x][0] = (R[x][-1] + 3*\text{DC value} + 2) >> 2, x > 0$$

Region R3)

$$Pred[0][y] = (R[0][y] + 3*\text{DC value} + 2) >> 2, y > 0$$

Region R4)

$$Pred[x][y] = \text{DC value}, x > 0, y > 0$$

In Equation 2, Wid denotes the horizontal length of the prediction block, and Hei denotes the vertical length of the prediction block. x, y denote the coordinate positions of each prediction pixel when the top leftmost point of the prediction block is set to (0,0). R denotes the neighboring pixel. For example, when the pixel s shown in FIG. 3 is defined as R[−1][−1], the pixel a to the pixel i are expressed in R[0][−1] to R[8][−1] and the pixel j to the pixel r are expressed in R[−1][0] to R[−1][8]. In the example shown in FIG. 3, as shown in Equation 2, according to the weighted sum filtering method, the prediction pixel value Pred is obtained for each of sections R1 to R4.

In a planar mode among non-directional modes, the neighboring pixels of the current block are linearly interpolated according to the distance, and the prediction pixel of the current block is generated. For example, FIG. 4 is a diagram illustrating an intra prediction method using the planar mode.

Figure 4:
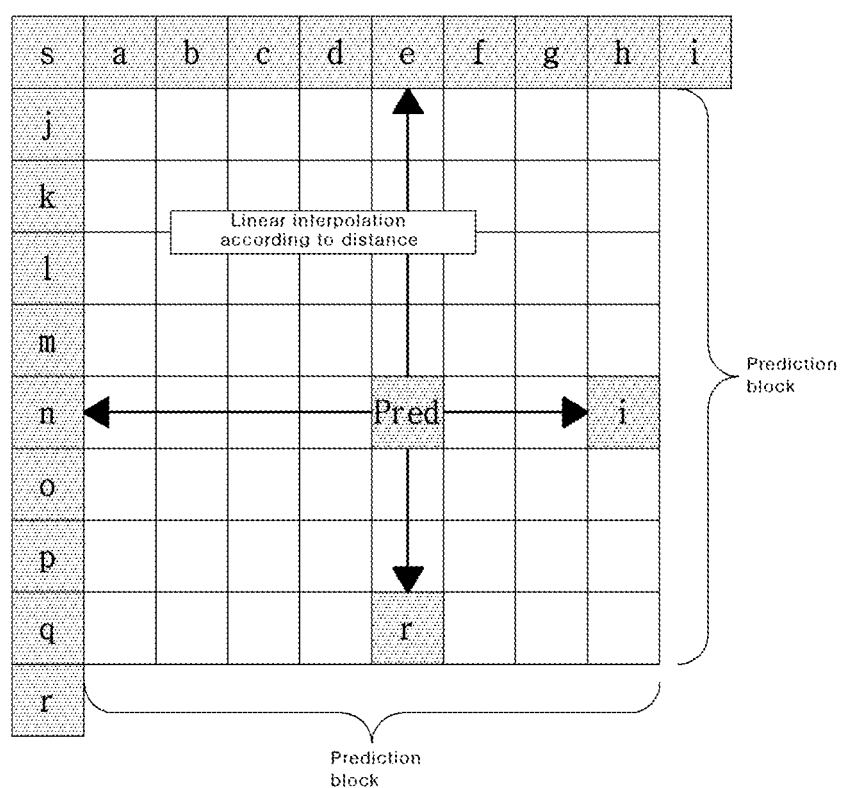
FIG. 4 is a diagram illustrating an intra prediction method using a planar mode.

For example, it is assumed that Pred shown in FIG. 4 is predicted in an 8×8 coding block. In this case, a vertical prediction value may be obtained by a linear interpolation method according to a distance in a vertical direction, the distance between the pixel e, which is positioned above Pred, and the pixel r positioned below Pred, which is a copy of the pixel r positioned to the lower left of Pred. Also, a horizontal prediction value may be obtained by a linear interpolation method according to a distance in a horizontal direction, the distance between the pixel n, which is positioned to the left of Pred, and the pixel i positioned to the right of Pred, which is a copy of the pixel i positioned to the upper right of Pred. Then, the average value of horizontal and vertical prediction values may be defined as the value of Pred. Equation 3 represents a process of obtaining the prediction value Pred under the planar mode.

$$Pred[x][y] = \frac{[(Wid - 1 - x) \times R[-1][y]] + [(x + 1) \times R[Wid][-1]] + [(Hei - 1 - y) \times R[x][-1]] + [(y + 1) \times R[-1][Hei]] + 1}{2}$$ [Equation 3]

In Equation 3, Wid denotes the horizontal length of the prediction block, and Hei denotes the vertical length of the prediction block. x, y denote the coordinates position of each prediction pixel when the top leftmost point of the prediction block is set to (0, 0). R denotes the neighboring pixel. For example, when the pixel s shown in FIG. 4 is defined as R[−1][−1], the pixel a to the pixel I are expressed in R[0][−1] to R[8] [−1] and the pixel j to the pixel r are expressed in R[−1][0] to R[−1][8].

Figure 5:
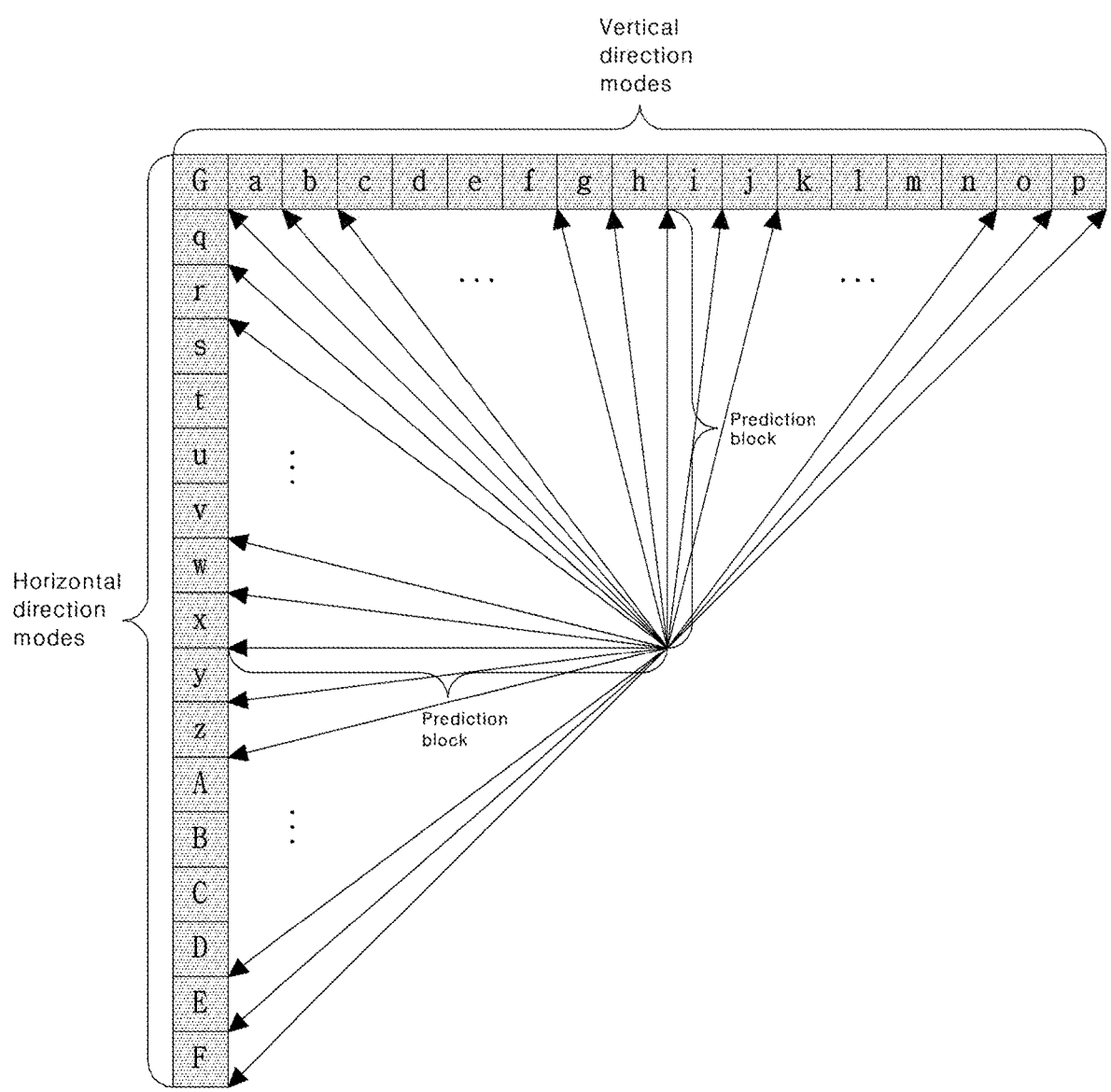
FIG. 5 is a diagram illustrating an intra prediction method using a directional prediction mode.

FIG. 5 is a diagram illustrating an intra prediction method using a directional prediction mode.

In the directional prediction mode (or an angular prediction mode), among the neighboring pixels of the current block, at least one pixel positioned in one of N predetermined directions is generated as the prediction sample.

Examples of the directional prediction mode may include horizontal direction modes and vertical direction modes. Here, the horizontal direction modes mean modes with larger horizontal directionality than the angular prediction mode in a 45-degree direction toward the top left. The vertical direction modes mean modes with larger vertical directionality than the angular prediction mode in a 45-degree direction toward the top left. The directional prediction mode with the prediction direction of 45 degrees toward the top left may be regarded as the horizontal direction mode or vertical direction mode. FIG. 5 shows the horizontal direction modes and vertical direction modes.

Referring to FIG. 5, for each direction, there is a direction that does not correspond to the integer pixel portion. In this case, after performing interpolation using various interpolation methods, such as a linear interpolation method according to a distance between the neighboring pixel and the pixel, a DCT-IF method, a cubic convolution interpolation method, and the like, the pixel value may be placed at the pixel position corresponding to the prediction block direction.

A residual value (a residual block or a transform block) between the generated prediction block and the original block may be input to the transform module 130. The residual block is the minimum unit for transform and quantization processes. The division method of the coding block may also be applied to the transform block. For example, the transform block may be divided into four or two partial blocks.

Prediction mode information used for prediction, motion vector information, and the like may be encoded with the residual value by the entropy encoding module 165 and may be transmitted to the apparatus for decoding. When a particular encoding mode is used, the original block is encoded as it is and transmitted to a decoding module without generating the prediction block by the prediction modules 120 and 125.

The inter prediction module 120 may predict the prediction unit on the basis of information on at least one among a previous picture and a subsequent picture of the current picture, or in some cases, may predict the prediction unit on the basis of information on some encoded regions in the current picture. The inter prediction module 120 may include a reference picture interpolation module, a motion prediction module, and a motion compensation module.

The reference picture interpolation module may receive reference picture information from the memory 155 and may generate pixel information of an integer pixel or less from the reference picture. In the case of luma pixels, an 8-tap DCT-based interpolation filter having different coefficients may be used to generate pixel information on an integer pixel or less on a per-¼ pixel basis. In the case of chroma signals, a 4-tap DCT-based interpolation filter having different filter coefficients may be used to generate pixel information on an integer pixel or less on a per-⅛ pixel basis.

The motion prediction module may perform motion prediction based on the reference picture interpolated by the reference picture interpolation module. As methods for calculating a motion vector, various methods, such as a full search-based block matching algorithm (FBMA), a three step search (TSS) algorithm, a new three-step search (NTS) algorithm, and the like may be used. The motion vector may have a motion vector value on a per-½ or -¼ pixel basis on the basis of the interpolated pixel. The motion prediction module may predict a current prediction unit by changing the motion prediction method. As motion prediction methods, various methods, such as a skip method, a merge method, an advanced motion vector prediction (AMVP) method, and the like may be used.

The apparatus for encoding may generate motion information on the current block on the basis of motion estimation or motion information on a close block. Here, the motion information may include at least one among the motion vector, a reference image index, and the prediction direction.

The intra prediction module 125 may generate a prediction unit on the basis of reference pixel information around a current block, which is pixel information in the current picture. When the neighboring block of the current prediction unit is a block subjected to inter prediction and thus a reference pixel is a pixel subjected to inter prediction, reference pixel information of a neighboring block subjected to intra prediction is used instead of the reference pixel included in the block subjected to inter prediction. That is, when a reference pixel is unavailable, at least one reference pixel of available reference pixels is used instead of unavailable reference pixel information.

Prediction modes in intra prediction may include a directional prediction mode using reference pixel information depending on a prediction direction and a non-directional mode not using directional information in performing prediction. A mode for predicting luma information may be different from a mode for predicting chroma information, and in order to predict the chroma information, intra prediction mode information used to predict the luma information or predicted luma signal information may be utilized.

In the intra prediction method, a prediction block may be generated after applying an adaptive intra smoothing (AIS) filter to a reference pixel depending on the prediction modes. The type of AIS filter applied to the reference pixel may vary. In order to perform the intra prediction method, an intra prediction mode of the current prediction unit may be predicted from the intra prediction mode of the prediction unit around the current prediction unit. In predicting the prediction mode of the current prediction unit by using mode information predicted from the neighboring prediction unit, when the intra prediction mode of the current prediction unit is the same as the intra prediction mode of the neighboring prediction unit, information indicating that the current prediction unit and the neighboring prediction unit have the same prediction mode is transmitted using predetermined flag information. When the prediction mode of the current prediction unit is different from the prediction mode of the neighboring prediction unit, entropy encoding is performed to encode prediction mode information of the current block.

Also, a residual block may be generated on the basis of prediction units generated by the prediction modules 120 and 125, wherein the residual block includes information on a residual value which is a difference value between the prediction unit subjected to prediction and the original block of the prediction unit. The generated residual block may be input to the transform module 130.

The transform module 130 transforms the residual signal into a frequency domain so that a residual block (or a transform block) with a transform coefficient is generated. Here, in order to transform the residual signal into the frequency domain, various transform techniques, such as discrete cosine transform (DCT), discrete sine transform (DST), Karhunen-Loeve transform (KLT), and the like may be used. In order to easily use the transform technique, matrix operations is performed using a basis vector. Here, depending on which prediction mode is used to encode the prediction block, the transform techniques may be variously combined for use in performing matrix operation. For example, in performing intra prediction, according to the prediction mode, discrete cosine transform may be used for the horizontal direction and discrete sine transform may be used for the vertical direction.

The quantization module 135 may quantize values transformed into a frequency domain by the transform module 130. That is, the quantization module 135 may quantize the transform coefficients of the transform block generated by the transform module 130, so that a quantized transform block with a quantized transform coefficient may be generated. Here, examples of the quantization technique may include dead zone uniform threshold quantization (DZUTQ), a quantization weighted matrix, or the like. It is also possible to use improved quantization techniques that these quantization techniques are improved. Quantization coefficients may vary according to a block or importance of an image. The values calculated by the quantization module 135 may be provided to the inverse quantization module 140 and the rearrangement module 160.

The transform module 130 and/or the quantization module 135 may be selectively included in the apparatus 100 for encoding the image. That is, the apparatus 100 for encoding the image may encode the residual block by performing at least one among transform and quantization on the residual data of the residual block, or by skipping both transform and quantization. Even though the apparatus 100 for encoding the image does not perform one of transform and quantization, or does not perform both transform and quantization, a block which is input to the entropy encoding module 165 is commonly referred to as a transform block (or a quantized transform block).

The rearrangement module 160 may perform rearrangement of coefficient values with respect to quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a predetermined scan type so as to change the coefficients to be in the form of one-dimensional vector.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAL).

The entropy encoding module 165 may encode a variety of information, such as residual value coefficient information and block type information of the coding unit, prediction mode information, division unit information, prediction unit information, transmission unit information, motion vector information, reference frame information, block interpolation information, filtering information, and the like from the rearrangement module 160 and the prediction modules 120 and 125. The entropy encoding module 165 may encode the coefficient of the transform block, on a per-partial block basis in the transform block, into various types of flags indicating a non-zero coefficient, a coefficient of which the absolute value is larger than one or two, the sign of the coefficient, and the like. The coefficients which are not encoded into the above flags may be encoded through the absolute value of the difference between the coefficient encoded through the flag and the actual coefficient of the transform block.

The entropy encoding module 165 may entropy encode the coefficient value of the coding unit input from the rearrangement module 160.

The inverse quantization module 140 may inversely quantize the values quantized by the quantization module 135 and the inverse transform module 145 may inversely transform the values transformed by the transform module 130.

In the meantime, the inverse quantization module 140 and the inverse transform module 145 may respectively perform inverse quantization and inverse transform by inversely using the quantization method and transform method used in the quantization module 135 and the transform module 130. Also, when only quantization is performed by the quantization module 135 and transform is not performed by the transform module 130, only inverse quantization is performed and inverse transform is not performed. When both transform and quantization are not performed, the inverse quantization module 140 and the inverse transform module 145 do not perform inverse transform and inverse quantization, or are not included in the apparatus 100 for encoding the image.

The residual value generated by the inverse quantization module 140 and the inverse transform module 145 may be combined with a prediction unit predicted by a motion estimation module, a motion compensation module, and the intra prediction module that are included in the prediction modules 120 and 125 so that a reconstructed block is generated.

The filter module 150 may include at least one of a deblocking filter, an offset correction module, and an adaptive loop filter (ALF).

The deblocking filter may remove block distortion that occurs due to boundaries between the blocks in the reconstructed picture. In order to determine whether to perform deblocking, whether to apply the deblocking filter to the current block may be determined on the basis of the pixels included in several rows and columns in the block. When the deblocking filter is applied to the block, a strong filter or a weak filter is applied depending on required deblocking filtering intensity. Also, in applying the deblocking filter, when performing horizontal direction filtering and vertical direction filtering, horizontal direction filtering and vertical direction filtering are configured to be processed in parallel.

The offset correction module may correct an offset from the original image on a per-pixel basis with respect to the image subjected to deblocking. In order to perform offset correction on a particular picture, used is a method of separating pixels of the image into the predetermined number of regions, determining a region to be subjected to offset, and applying the offset to the determined region or a method of applying an offset in consideration of edge information of each pixel.

Adaptive loop filtering (ALF) may be performed on the basis of the value obtained by comparing the filtered reconstructed image and the original image. The pixels included in the image may be divided into predetermined groups, a filter to be applied to each of the groups may be determined, and filtering may be individually performed on each group. Information on whether to apply ALF and a luma signal may be transmitted for each coding unit (CU). The form and filter coefficient of a filter for ALF to be applied may vary according to each block. Also, the filter for ALF in the same form (fixed form) may be applied regardless of the characteristic of the application target block.

The memory 155 may store the reconstructed block of the picture calculated through the filter module 150. The stored reconstructed block or picture may be provided to the prediction modules 120 and 125 in performing inter prediction.

Figure 2:
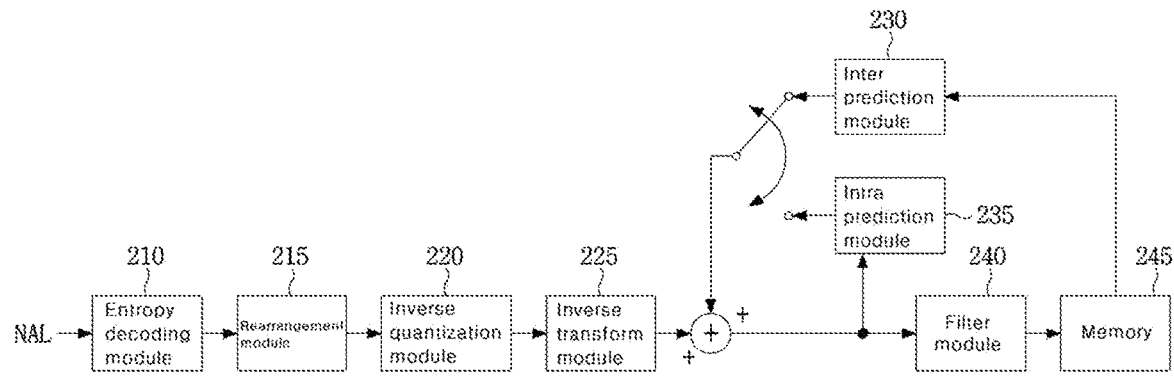
FIG. 2 is a block diagram illustrating an apparatus for decoding an image according to an embodiment of the present invention.

FIG. 2 is a block diagram illustrating an apparatus for decoding an image according to an embodiment of the present invention.

Referring to FIG. 2, an apparatus 200 for decoding an image may include an entropy decoding module 210, a rearrangement module 215, an inverse quantization module 220, an inverse transform module 225, prediction modules 230 and 235, a filter module 240, and a memory 245.

When an image bitstream is input from the apparatus for encoding the image, the input bitstream is decoded according to an inverse process of the apparatus for encoding the image.

The entropy decoding module 210 may perform entropy decoding according to the inverse process of entropy encoding by the entropy encoding module of the apparatus for encoding the image. For example, corresponding to the methods performed by the apparatus for encoding the image, various methods, such as exponential Golomb coding, context-adaptive variable length coding (CAVLC), and context-adaptive binary arithmetic coding (CABAC) may be applied. The entropy decoding module 210 may decode the coefficient of the transform block, on a per-partial block basis in the transform block, on the basis of various types of flags indicating the non-zero coefficient, the coefficient of which the absolute value is larger than one or two, the sign of the coefficient, and the like. The coefficients which are not expressed using the above flags may be decoded through the sum of the coefficient expressed by the flag and the signaled coefficient.

The entropy decoding module 210 may decode information on intra prediction and inter prediction performed by the apparatus for encoding.

The rearrangement module 215 may perform rearrangement on the bitstream entropy decoded by the entropy decoding module 210 on the basis of the rearrangement method used in the apparatus for encoding. The coefficients expressed in the form of the one-dimensional vector may be reconstructed and rearranged into the coefficients in the form of the two-dimensional block. The rearrangement module 215 may perform rearrangement through a method of receiving information related to coefficient scanning performed in the apparatus for encoding and of inversely scanning on the basis of the scanning order performed in the apparatus for encoding.

The inverse quantization module 220 may perform inverse quantization on the basis of a quantization parameter received from the apparatus for encoding and the rearranged coefficient values of the block.

The inverse transform module 225 may perform inverse transform on the transform coefficient subjected to inverse quantization using a predetermined transform method. Here, the transform method may be determined on the basis of information on the prediction method (inter/intra prediction), the size/shape of the block, the intra prediction mode, and the like.

The prediction modules 230 and 235 may generate a prediction block on the basis of information on prediction block generation received from the entropy decoding module 210 and information on a previously decoded block or picture received from the memory 245.

The prediction modules 230 and 235 may include a prediction unit determination module, an inter prediction module, and an intra prediction module. The prediction unit determination module may receive a variety of information, such as prediction unit information, prediction mode information of the intra prediction method, information on motion prediction of the inter prediction method, and the like from the entropy decoding module 210, may separate the prediction unit in the current coding unit, and may determine whether inter prediction or intra prediction is performed on the prediction unit. By using information required in inter prediction of the current prediction unit received from the apparatus for encoding the image, the inter prediction module 230 may perform inter prediction on the current prediction unit on the basis of information on at least one among a previous picture and a subsequent picture of the current picture including the current prediction unit. Alternatively, inter prediction may be performed on the basis of information on some pre-reconstructed regions in the current picture including the current prediction unit.

In order to perform inter prediction, it may be determined which of a skip mode, a merge mode, and an AMVP mode is used as the motion prediction method of the prediction unit included in the coding unit, on the basis of the coding unit.

The intra prediction module 235 may generate a prediction block on the basis of pixel information in the current picture. When the prediction unit is a prediction unit subjected to intra prediction, intra prediction is performed on the basis of intra prediction mode information of the prediction unit received from the apparatus for encoding the image. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. The prediction mode of the prediction unit received from the apparatus for encoding the image and AIS filter information are used in performing AIS filtering on the reference pixel of the current block. When the prediction mode of the current block is a mode in which AIS filtering is not performed, the AIS filter is not applied.

When the prediction mode of the prediction unit is a prediction mode in which intra prediction is performed on the basis of the pixel value obtained by interpolating the reference pixel, the reference pixel interpolation module may interpolate the reference pixel to generate the reference pixel in units of a pixel of an integer value or less. When the prediction mode of the current prediction unit is a prediction mode in which a prediction block is generated without interpolating the reference pixel, the reference pixel is not interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

From the apparatus for encoding the image, received is information on whether the deblocking filter is applied to the relevant block or picture and information on whether a strong filter or a weak filter is applied when the deblocking filter is applied. The deblocking filter of the apparatus for decoding the image may receive information on the deblocking filter from the apparatus for encoding the image, and the apparatus for decoding the image may perform deblocking filtering on the relevant block.

The offset correction module may perform offset correction on the reconstructed image on the basis of the type of offset correction, offset value information, and the like applied to the image in performing encoding.

The ALF may be applied to the coding unit on the basis of information on whether to apply the ALF, ALF coefficient information, and the like received from the apparatus for encoding. The ALF information may be provided as being included in a particular parameter set.

The memory 245 may store the reconstructed picture or block for use as a reference picture or a reference block, and may provide the reconstructed picture to an output module.

The coding block may be divided into one or more blocks. Specifically, here, the coding block may be divided into a maximum-size coding block to a minimum-size coding block on the basis of quad-tree division, binary-tree division (or dual-tree division), or the like. Information on the maximum-size coding block and minimum-size coding block or information on a difference value between the maximum-size coding block and the minimum-size coding block may be signaled to the apparatus for decoding in the bitstream.

Quad-tree (QT) division is a method of dividing the coding block into four blocks. By QT division, the coding block may be divided into four blocks of which the horizontal and vertical lengths are reduced by ½. Information on the maximum size or minimum size of the coding block on which QT division is possible, the number of times for QT division (or the maximum division depth), the division depth of the minimum-size block, the depth for division in the maximum-size coding block or current coding block on which QT division is possible, and the like may be signaled over the upper-layer header. Here, examples of the upper-layer header may include a slice layer, a picture layer, a sequence layer, a video layer, and the like.

Binary-tree (BT) division is a method of dividing the coding block into two blocks. By BT division, the coding block may be divided into two blocks in the horizontal or vertical direction. For example, the coding block may be, by BT division, divided into two blocks of which the horizontal or vertical lengths are reduced by ½ or two blocks of which the horizontal or vertical lengths are recued in ¾ and ¼. As described above, BT division may mean a method of dividing the coding block with a precision of 1/N (N≥2). Information on the maximum size or minimum size of the coding block on which BT division is possible, the number of times for BT division (or the maximum division depth), division depth of the minimum-size block, the maximum depth for BT division based on the maximum-size coding block, BT division depth or division precision available from the current coding block, and the like may be signaled over the upper-layer header.

Examples of BT division may include symmetrical binary tree (SBT) division in which the current block is divided into two blocks in a symmetrical shape, and an asymmetrical binary-tree (ASBT) division in which the current block is divided into two blocks in an asymmetrical shape. SBT division represent a division shape using a precision of ½, and by SBT division, the current block may be divided into two blocks in the same size. In contrast, ASBT division represent a division shape using a precision less than ½ (namely, 1/M, here, M is an integer greater than two), and by ASBT division, the current block may be divided into two blocks in different sizes. On the basis of the maximum-size coding block, information on the maximum depth for SBT or ASBT division, the SBT or ASBT depth available from the current coding block, the number of times for SBT or ASBT division (or maximum division depth), the maximum size or minimum size of the coding block on which SBT or ASBT division is possible, and the like may be signaled over the upper-layer header.

Hereinafter, for convenience of description, it is assumed that QT division indicates that the current coding/decoding block is divided into four blocks and BT division indicates that the current coding/decoding block is divided into two blocks. Moreover, it is assumed that SBT division means that the current coding/decoding block is divided into two blocks and the division shape is symmetrical, and ASBT division means that the division shape is asymmetrical.

Hereinafter, QT division and BT division will be described in detail with reference to the accompanying drawings. In the embodiments described later, a block which is the current encoding/decoding target is referred to as the current coding block, the current decoding block, or the current block. Here, according to the encoding/decoding process, the current coding/decoding block may mean one among the coding block (or the coding unit), the prediction block (or the prediction unit), the transform block (or the transform unit), and a partial block included therein.

Figure 6:
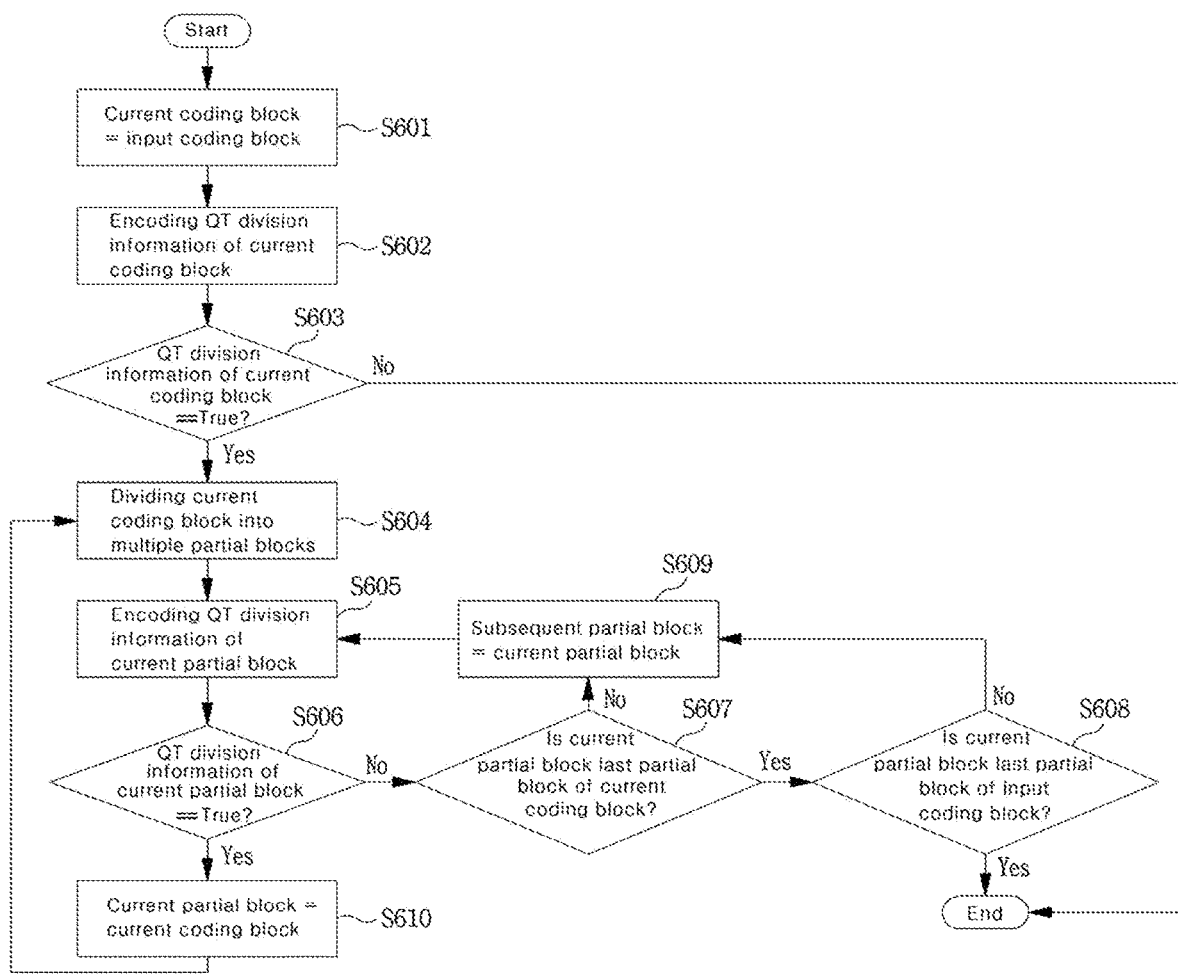
FIG. 6 is a diagram illustrating a method of encoding QT division information for a coding block.

FIG. 6 is a diagram illustrating a method of encoding QT division information for a coding block. In the embodiment, the "current" coding block represents the encoding target block at a specific time. For example, the current coding block may mean a block with the division depth in which current coding is performed. For example, when a coding block is input for encoding, the coding block input first is regarded as "the current coding block". After, as the coding block is divided, when encoding is performed on the resulting block from the division, the resulting block from the division is regarded as the "current coding block".

When the coding block is input, the input coding block is regarded as the "current coding block" at step S601. The coding block input first may mean the coding block with the highest division depth to be encoded (namely, the coding block with the depth of zero).

The apparatus for encoding may encode the QT division information on the current coding block at step S602. Here, the QT division information indicates whether QT division is performed on the current coding block. When QT division is performed on the current coding block, the QT division information is set to "true", and when QT division is not performed on the current coding block, the QT division information is set to "false".

When determining that QT division is not performed on the current coding block at step S603, the QT division process on the current coding block ends. In contrast, when determining that QT division is performed on the current coding block at step S603, four partial blocks (or sub blocks) included in the current coding block are generated through QT division at step S604.

When the current coding block is divided into four partial blocks, one of the partial blocks included in the current coding block is set as the current partial block and QT division information on the current partial block is encoded according to the encoding order at step S605. Here, the encoding order of the partial blocks may be based on raster scanning, Z scanning, or the like, or may be a pre-defined order. That is, according to the encoding order of the partial blocks, QT division information on the partial blocks is encoded in order.

When determining that QT division is not performed on the current partial block at step S606, the QT division process ends depending on whether the current partial block is the last block in the current coding block and the input coding block at steps S607 and S608. For example, when QT division is not performed on the current partial block and the current partial block is the last block in the current coding block and the input coding block, the QT division process ends. In contrast, when the current partial block is not the last partial block in the current coding block, or when the current coding block is the last partial block in the current coding block but is not the last partial block in the input coding block, in the scanning order, the subsequent partial block is regarded as the current partial block and the process of encoding the QT division information is performed at step S609.

In contrast, when determining that QT division is performed on the current partial block at step S606, the current partial block is set as the current coding block at step S610 and the newly set current coding block is divided into four partial blocks at step S604. When the newly set current coding block is divided into four partial blocks, the process of encoding the QT division information is repeatedly performed on the newly generated four partial blocks at steps S605 to S610.

The apparatus for encoding may encode, on the basis of the result of dividing the current coding block, via the upper-layer header, the maximum size of the coding block on which QT division is possible, the depth of the coding block on which QT division is possible, and the like.

The result of dividing the current coding block may be used in, with respect to the subsequent coding block, determining the maximum size of the coding block on which QT division is possible, the depth of the coding block on which QT division is possible, and the like.

The apparatus for encoding may use BT division information to encode whether the current coding block is divided into two blocks. Here, the BT division information may be information that indicates whether the current coding block is divided into two blocks. The apparatus for encoding may further encode, information indicating whether the division shape is SBT or ASBT, when the current coding block is divided into two blocks. Here, information indicating the division shape of the current coding block may be a one-bit flag, but it is not limited thereto.

As another example, the apparatus for encoding may use SBT division information or ASBT division information to indicate whether SBT division or ASBT division is performed on the current coding block. Here, the SBT division information indicates whether the current coding block is divided into two blocks in symmetrical shape, and the ASBT division information indicates whether the current coding block is divided into two blocks in asymmetrical shape.

Figure 7:
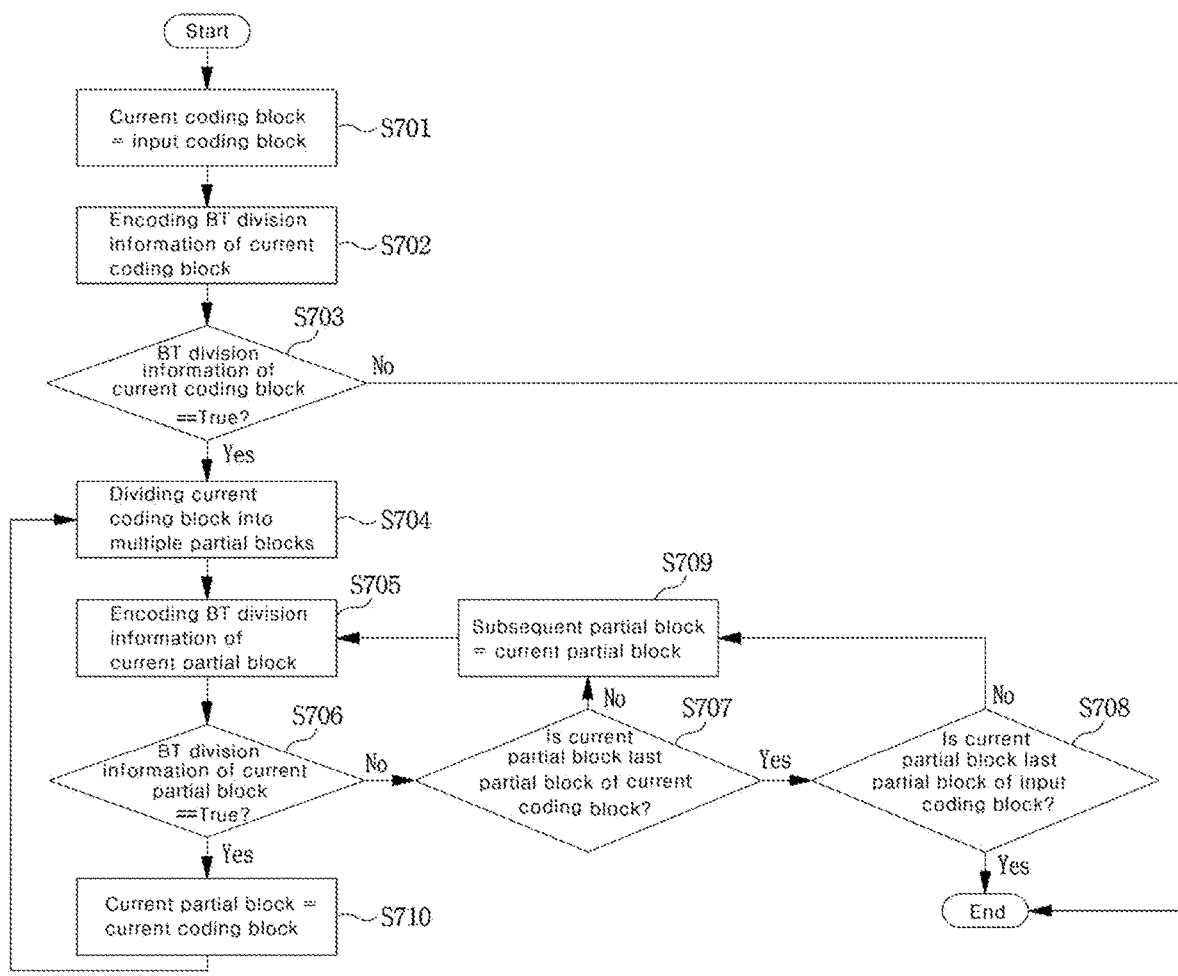
FIG. 7 is a diagram illustrating a method of encoding BT division information for a coding block.

Herein, in FIG. 7, it is assumed that the BT division information is used to encode whether the current coding block is divided into two blocks. Although not shown, whether the current coding block is divided into two blocks may be encoded using the SBT division information or the ASBT division information. When encoding the SBT division information or the ASBT division information, in FIG. 7, BT division or BT division information is replaced with SBT/ASBT division or SBT/ASBT division information. For example, in order to determine whether SBT division is performed on the current coding block, the BT information in FIG. 7 may be replaced with the SBT division information. Also, in order to determine whether ASBT division is performed on the current coding block, the BT information in FIG. 7 may be replaced with the ASBT division information.

FIG. 7 is a diagram illustrating a method of encoding BT division information for a coding block.

When the coding block is input, the input coding block is regarded as the "current coding block" at step S701. The coding block input first may mean the coding block with the highest division depth to be encoded (namely, the coding block with the depth of zero).

The apparatus for encoding may encode the BT division information on the current coding block at step S702. Here, the BT division information indicates whether BT division is performed on the current coding block. When BT division is performed on the current coding block, the BT division information is set to "true", and when BT division is not performed on the current coding block, the BT division information is set to "false".

When encoding the SBT division information, the apparatus for encoding sets the value of the SBT division information according to whether SBT division is performed on the current coding block. For example, when the current coding block is divided into two blocks in symmetrical shape, the SBT division information is set to "true". In contrast, when the current coding block is not divided into two blocks or is divided in asymmetrical shape, the SBT division information is set to "false".

Similarly, when encoding the ASBT division information, the apparatus for encoding sets the value of the ASBT division information according to whether ASBT division is performed on the current coding block. For example, when the current coding block is divided into two blocks in asymmetrical shape, the ASBT division information is set to "true". In contrast, when the current coding block is not divided into two blocks or is divided in symmetrical shape, the ASBT division information is set to "false".

When the BT division information is encoded, the SBT division information and the ASBT division information are not encoded. In contrast, when the BT division information is not encoded, at least one among the SBT division information and the ASBT division information is encoded. Here, when one among the SBT division information and the ASBT division information indicates "false", the other one is encoded. For example, when the SBT division information indicates "true", the ASBT division information is not encoded. When the SBT division information indicates "false", the ASBT division information is encoded.

When the current coding block is divided into two partial blocks, the apparatus for encoding may further encode information on a division direction. Here, the division direction indicates whether the current coding block is divided in the horizontal direction or vertical direction.

When determining that BT division is not performed on the current coding block at step S703, the BT division process on the current coding block ends. In contrast, when determining that BT division is performed on the current coding block at step S703, two partial blocks (or sub blocks) included in the current coding block are generated through BT division at step S704.

When the current coding block is divided into two partial blocks, one of the partial blocks included in the current coding block is set as the current partial block and the BT division information on the current partial block is encoded according to the encoding order at step S705. Here, the encoding order of the partial blocks may be based on raster scanning, Z scanning, or the like, or may be a pre-defined order. That is, according to the encoding order of the partial blocks, BT division information on the partial blocks is encoded in order.

When determining that BT division is not performed on the current partial block at step S706, the BT division process ends depending on whether the current partial block is the last block in the current coding block and the input coding block at steps S707 and S708. For example, when BT division is not performed on the current partial block and the current partial block is the last block in the current coding block and the input coding block, the BT division process ends. In contrast, when the current partial block is not the last partial block in the current coding block, or when the current coding block is the last partial block in the current coding block but is not the last partial block in the input coding block, in the scanning order, the subsequent partial block is regarded as the current partial block and the process of encoding the BT division information is performed at step S709.

In contrast, when BT division is performed on the current partial block at step S706, the current partial block is set at the current coding block at step S710 and the newly set current coding block is divided into two partial blocks at step S704. When the newly set current coding block is divided into two partial blocks, the process of encoding the BT division information is repeatedly performed on the newly generated two partial blocks at steps S705 to S710.

The apparatus for encoding may encode, on the basis of the result of encoding the current coding block, via the upper-layer header, the maximum size of the coding block on which BT division (or SBT/ASBT division) is possible, the depth of the coding block on which BT division (or SBT/ASBT division) is possible, and the like.

Figure 8:
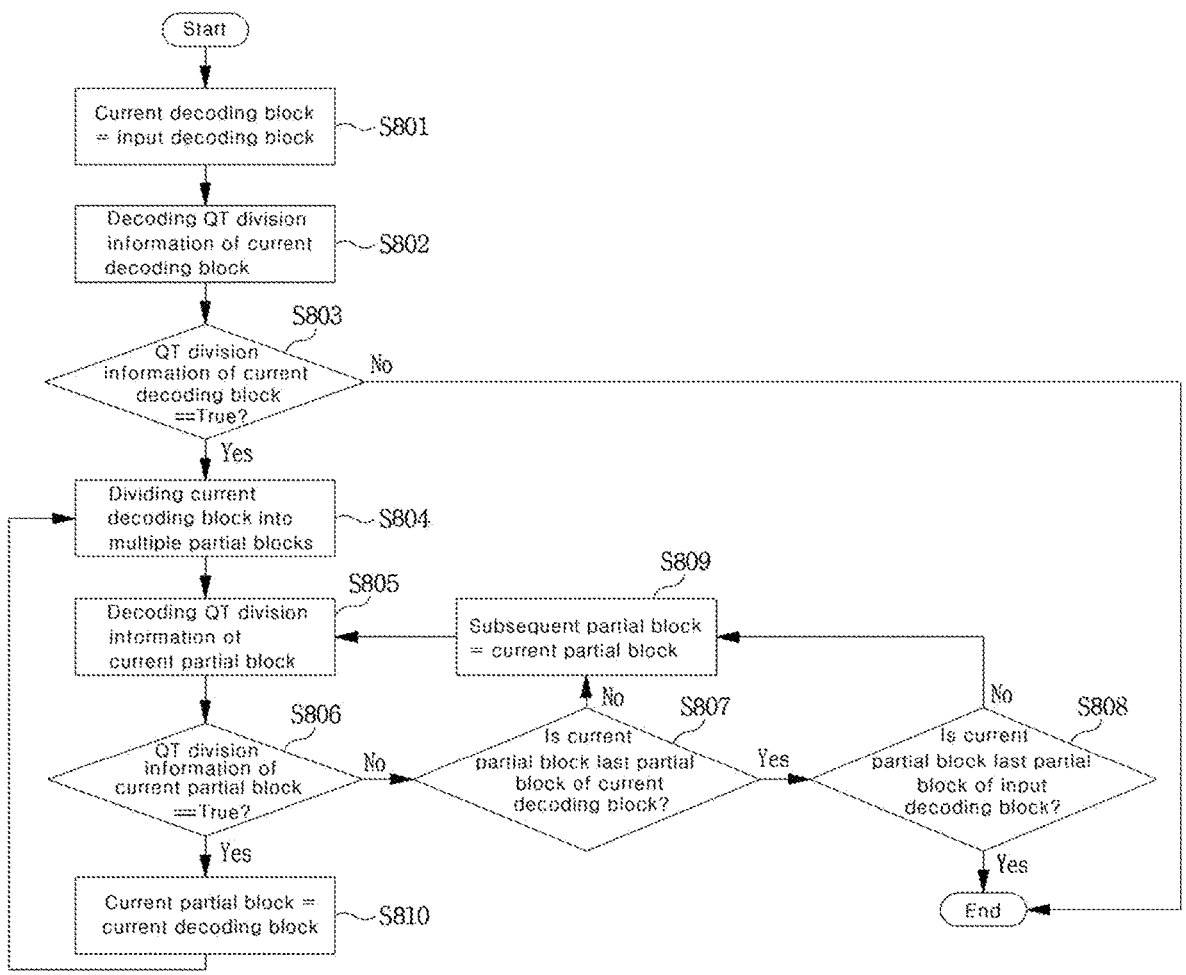
FIG. 8 is a diagram illustrating a method of decoding QT division information for a decoding block.

FIG. 8 is a diagram illustrating a method of decoding QT division information for a decoding block. In the embodiment, the "current" decoding block represents the decoding target block at a specific time. For example, the current decoding block may mean a block with the division depth in which current decoding is performed. For example, when a decoding block is input for decoding, the decoding block input first is regarded as "the current decoding block". After, as the decoding block is divided, when decoding is performed on the resulting block from the division, the resulting block from the division is regarded as the "current decoding block".

When the decoding block is input, the input decoding block is regarded as the "current decoding block" at step S801. The decoding block input first may mean the decoding block with the highest division depth to be decoded (namely, the decoding block with the depth of zero).

The apparatus for decoding may decode the QT division information on the current decoding block at step S802. Here, the QT division information indicates whether QT division is performed on the current decoding block. When the QT division information indicates "true", QT division is performed on the current decoding block, and when the QT division information indicates "false", QT division is not performed on the current decoding block.

When the QT division information indicates false, namely, when determining that QT division is not performed on the current decoding block at step S803, the QT division process on the current decoding block ends. In contrast, when the QT division information indicates true, namely, when determining that QT division is performed on the current decoding block at step S803, four partial blocks (or sub blocks) included in the current decoding block are generated through QT division at step S804.

When the current decoding block is divided into four partial blocks, one of the partial blocks included in the current decoding block is set as the current partial block and the QT division information on the current partial block is decoded according to the decoding order at step S805. Here, the decoding order of the partial blocks may be based on raster scanning, Z scanning, or the like, or may be a pre-defined order. That is, according to the decoding order of the partial blocks, QT division information on the partial blocks is decoded in order.

When the QT division information on the current partial block indicates false, namely, when determining that QT division is not performed on the current partial block at step S806, the QT division process ends depending on whether the current partial block is the last block in the current decoding block and the input decoding block at steps S807 and S808. For example, when QT division is not performed on the current partial block and the current partial block is the last block in the current decoding block and the input decoding block, the QT division process ends. In contrast, when the current partial block is not the last partial block in the current decoding block, or when the current decoding block is the last partial block in the current decoding block but is not the last partial block in the input decoding block, in the scanning order, the subsequent partial block is regarded as the current partial block and the process of decoding the QT division information is performed at step S809.

In contrast, when the QT division information on the current partial block indicates true, namely, when determining that QT division is performed on the current partial block at step S806, the current partial block is set as the current decoding block at step S810 and the newly set current decoding block is divided into four partial blocks at step S804. When the newly set current decoding block is divided into four partial blocks, the process of decoding the QT division information is repeatedly performed on the newly generated four partial blocks at steps S805 to S810.

In the embodiment, when the size of the current decoding block is equal to or smaller than the maximum block size in which QT division is possible, which is signaled from the upper-layer header, or when the depth of the current decoding block is equal to or greater than the maximum block depth in which QT division is possible, which is signaled from the upper-layer header, decoding of the division information on the current decoding block is omitted and QT division is not further performed on the current decoding block.

The apparatus for decoding may determine whether the current decoding block is divided into two blocks using the BT division information, the SBT division information, or the ASBT division information. Here, the BT division information indicates whether the current decoding block is divided into two blocks, and the SBT division information indicates whether the current decoding block is divided into two blocks in symmetrical shape. The ASBT division information indicates whether the current decoding block is divided into two blocks in asymmetrical shape.

In the case of using the BT division information, when the BT division information indicates that the current decoding block is divided into two blocks, the apparatus for decoding further decodes information indicating the division shape (for example, the symmetrical or asymmetrical shape) of the current decoding block. In contrast, the SBT division information or the ASBT division information indicates the division shape of the current decoding block, so that when this information is decoded, the information indicating the division shape of the current decoding block is not further decoded.

Hereinafter, a method of encoding the BT division information will be described with reference to FIG. 9. However, the embodiment shown in FIG. 9 may be used in encoding the SBT division information or the ASBT division information. For example, in order to determine whether SBT division is performed on the current coding block, the BT information in FIG. 9 may be replaced with the SBT division information. Also, in order to determine whether ASBT division is performed on the current coding block, the BT information in FIG. 9 may be replaced with the ASBT division information.

Figure 9:
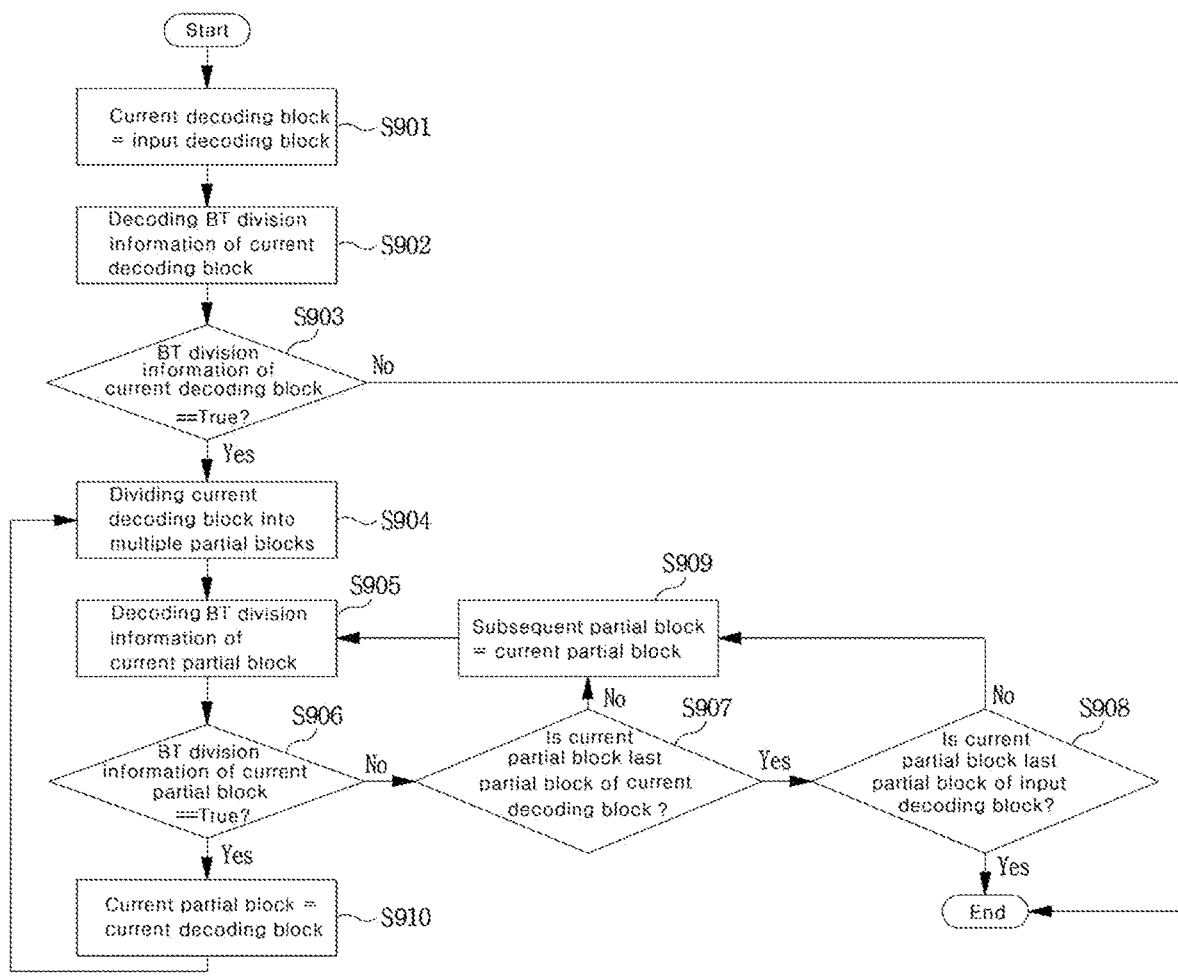
FIG. 9 is a diagram illustrating a method of decoding BT division information for a decoding block.

FIG. 9 is a diagram illustrating a method of decoding BT division information for a decoding block.

When the decoding block is input, the input decoding block is regarded as the current decoding block at step S901. The decoding block input first may mean the decoding block with the highest division depth to be decoded (namely, the decoding block with the depth of zero).

The apparatus for decoding may decode the BT division information on the current decoding block at step S902. Here, the BT division information indicates whether BT division is performed on the current decoding block. When the BT division information indicates "true", BT division is performed on the current decoding block, and when the BT division information indicates "false", BT division is not performed on the current decoding block.

When decoding the SBT division information, the SBT division information indicates whether SBT division is performed on the current decoding block. For example, when the SBT division information indicates "true", SBT division is performed on the current decoding block, and when the SBT division information indicates "false", SBT division is not performed on the current decoding block.

When decoding the ASBT division information, the ASBT division information indicates whether ASBT division is performed on the current decoding block. For example, when the ASBT division information indicates "true", ASBT division is performed on the current decoding block, and when the SBT division information indicates "false", SBT division is not performed on the current decoding block.

When the BT division information is decoded, the SBT division information and the ASBT division information are not decoded. In contrast, when the BT division information is not decoded, at least one among the SBT division information and the ASBT division information is decoded. Here, when one among the SBT division information and the ASBT division information indicates "false", the other one is decoded. For example, when the SBT division information indicates "true", the ASBT division information is not decoded, and when the SBT division information indicates "false", the ASBT division information is decoded.

When the BT division information indicates true, namely, when the current decoding block is divided into two blocks, the apparatus for decoding further decode information on a division direction. Here, the division direction indicates whether the current decoding block is divided in the horizontal direction or vertical direction.

When the BT division information indicates false, namely, when determining that BT division is not performed on the current decoding block at step S903, the BT division process on the current decoding block ends. In contrast, when the BT division information indicates true, namely, when determining that BT division is performed on the current decoding block at step S903, two partial blocks (or sub blocks) included in the current decoding block may be generated through BT division at step S904.

When the current decoding block is divided into two partial blocks, one of the partial blocks included in the current decoding block is set as the current partial block and the BT division information on the current partial block is decoded according to the decoding order at step S905. Here, the decoding order of the partial blocks may be based on raster scanning, Z scanning, or the like, or may be a pre-defined order. That is, according to the decoding order of the partial blocks, BT division information on the partial blocks is decoded in order.

When determining that BT division is not performed on the current partial block at step S906, the BT division process ends depending on whether the current partial block is the last block in the current decoding block and the input decoding block at steps S907 and S708. For example, when BT division is not performed on the current partial block and the current partial block is the last block in the current decoding block and the input decoding block, the BT division process ends. In contrast, when the current partial block is not the last partial block in the current decoding block, or when the current decoding block is the last partial block in the current decoding block but is not the last partial block in the input decoding block, in the scanning order, the subsequent partial block is regarded as the current partial block and the process of decoding the BT division information is performed at step S909.

In contrast, when determining that BT division is performed on the current partial block at step S906, the current partial block is set as the current decoding bloc at step S910 and the newly set current decoding block is divided into two partial blocks at step S904. When the newly set current decoding block is divided into two partial blocks, the process of decoding the BT division information is repeatedly performed on the newly generated two partial blocks at steps S905 to S910.

In the embodiment, when the size of the current decoding block is equal to or smaller than the maximum block size in which BT division (or SBT/ASBT division) is possible, which is signaled from the upper-layer header, or when the depth of the current decoding block is equal to or greater than the maximum block depth in which BT division (or SBT/ASBT division) is possible, which is signaled from the upper-layer header, decoding of the division information on the current decoding block is omitted and BT division is not further performed on the current decoding block.

In the examples shown in FIGS. 6 to 9, described is the method of recursively dividing the coding/decoding block of the maximum size by using QT division or BT division (or SBT/ASBT division). Here, in dividing the coding/decoding block into multiple partial blocks, the QT division method and the BT division method are used in combination. Here, the order of QT division and BT division may be variously set. For example, the apparatus for encoding divides, using QT division, the maximum coding block, and when there is a partial block in which the BT division is determined to be optimum, QT division is terminated, and the partial block is divided using BT division. Alternatively, even though the partial block is generated using BT division, when the QT division is determined to be optimum, the partial block is divided using QT division again. As described above, the apparatus for encoding may check the optimum division method for each block, and according thereto, may encode information indicating the optimum division method of each block.

As another example, the apparatus for decoding decodes the QT division information or the BT division information, so that the optimum division state of the decoding block is determined. Here, one among the QT division method and the BT division method may be applied only when the other method is not applied. For example, the BT division information on a predetermined block is decoded, only when the QT division information on the predetermined block indicates false or BT division is performed on the upper-layer block including the predetermined block.

In encoding block division information, the apparatus for encoding may encode information indicating whether each division method is used, via the upper-layer header. For example, the apparatus for encoding may encode, via the upper-layer header, information indicating whether QT division is used or information indicating whether BT division is used. For example, when determining that QT division is used but BT division is not used, the coding block is divided using only QT division. In this case, encoding of the BT division information that indicates whether BT division is performed on the coding block may be omitted. As another example, when determining that both QT division and BT division are used, the coding block is divided using QT and BT division modes.

Figure 10:
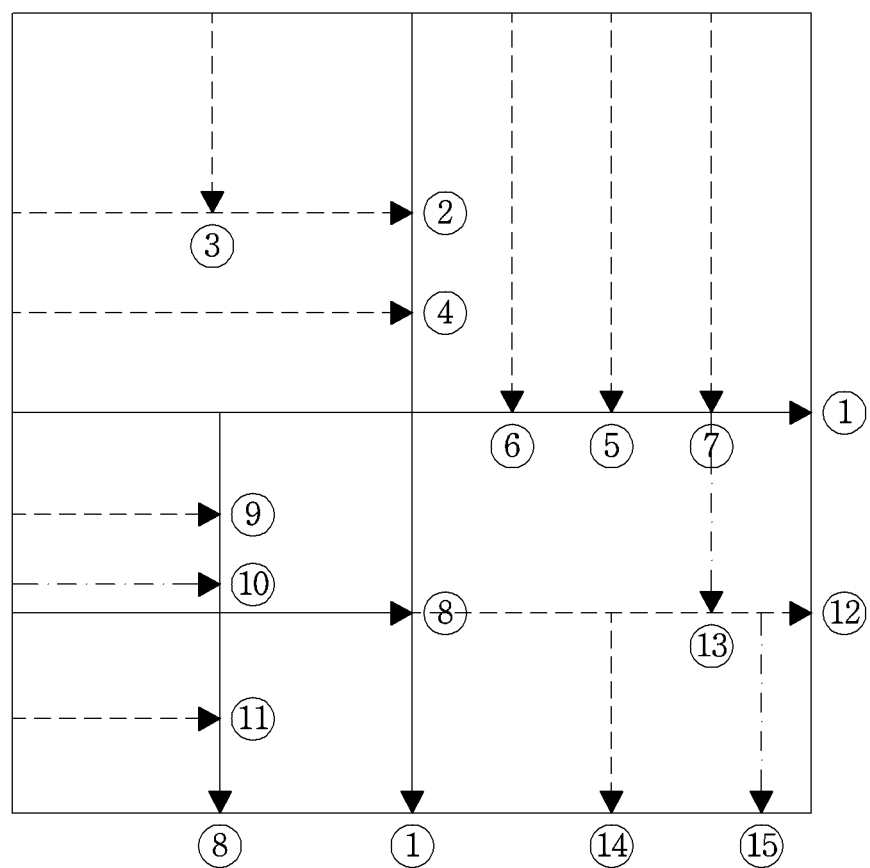
FIG. 10 is a diagram illustrating an example of a division state in a coding block.

FIG. 10 is a diagram illustrating an example of a division state in a coding block.

For convenience of description, when BT division is performed on the block, it is assumed that partial block the generated by BT division is not further divided into BT blocks. Moreover, it is assumed that whether the current coding block is divided into two blocks is indicated by the SBT division information or the ASBT division information. In the example shown in FIG. 10, the solid line indicates that the QT division method is used for division, and the broken line indicates that the SBT division method is used for division. The dot-and-dash line indicates that the ASBT division method is used for division.

Referring to FIG. 10, by QT division, the sub block of which the horizontal and vertical lines are reduced by ½ compared to the upper-layer block is generated, and by SBT division, the sub block of which one among the horizontal and vertical lines is reduced by ½ compared to the upper-layer block is generated. By ASBT division, the sub block of which one among the horizontal and vertical lines is reduced in ¼ compared to the upper-layer block is generated. In FIG. 10, the numerals marked on division lines indicate the division order.

Referring to FIG. 10, the division lines ① indicate that QT division is optimum in the coding block which is input first. The division line ② indicates that SBT horizontal division is optimum division in the top left partial block that results from the division lines ①. The division line ③ indicates that SBT vertical division is optimum division in the upper partial block that results from the division line ②. The division line ④ indicates that SBT horizontal division is optimum division in the lower partial block that results from the division link ②. The division line ⑤ indicates that SBT vertical division is optimum division in the top right partial block that results from the division lines ①. The division line ⑥ indicates that SBT vertical division is optimum division in the left partial block that results from the division line ⑤. The division line ⑦ indicates that SBT vertical division is optimum division in the right partial block that results from the division line ⑤. The division lines ⑧ indicate that QT division is optimum division in the bottom left partial block that results from the division lines ①. The division line ⑨ indicates that SBT horizontal division is optimum division in the upper left partial block that results from the division lines ⑧. The division line ⑩ indicates that ASBT ¾ horizontal division is optimum division in the lower partial block that results from the division line ⑨. The division line ⑪ indicates that SBT horizontal division is optimum division in the bottom left partial block that results from the division lines ⑧. The division line ⑫ indicates that SBT horizontal division is optimum division in the bottom right partial block that results from the division lines ①. The division line ⑬ indicates that ASBT ¾ vertical division is optimum division in the upper partial block that results from the division line ⑫. The division line ⑭ indicates that SBT vertical division is optimum division in the lower partial block that results from the division line ⑫. The division line ⑮ indicates that ASBT ¾ vertical division is optimum division in the right partial block that results from the division line ⑭.

Figure 11:
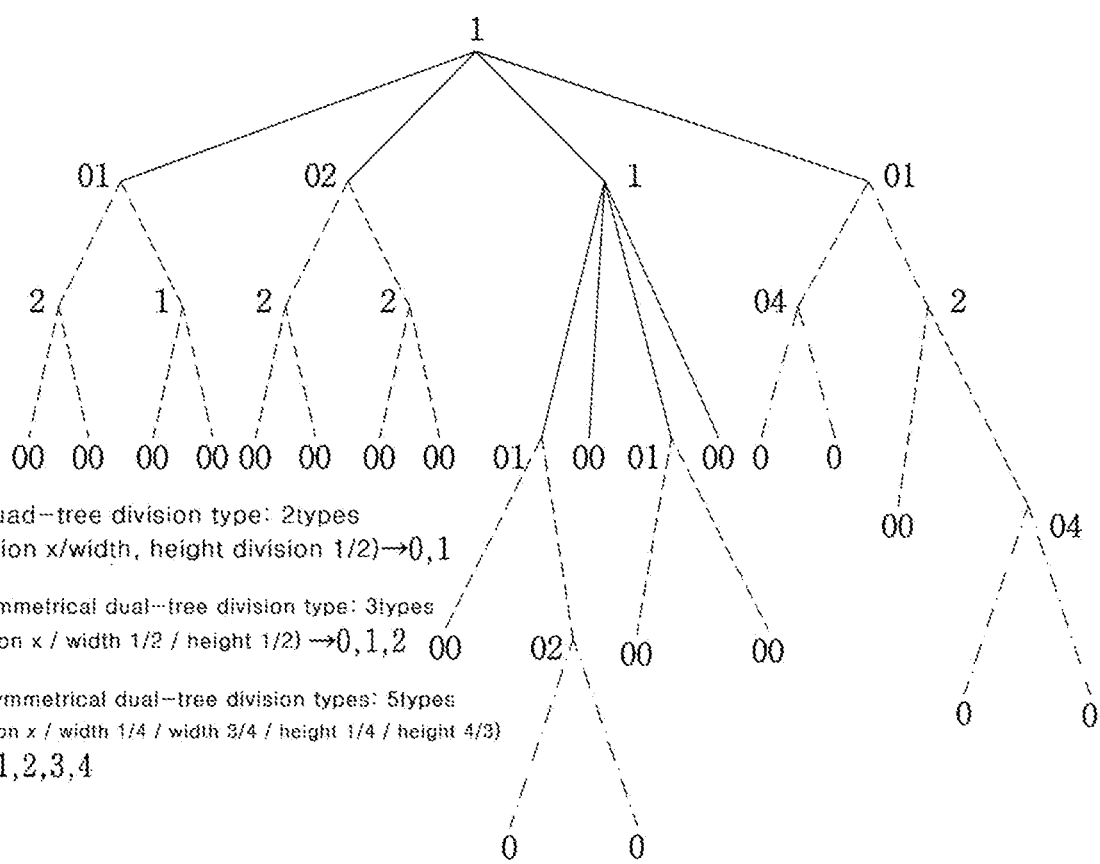
FIG. 11 is a diagram illustrating that optimum division states of an input coding block shown in FIG. 10 are expressed using a tree structure.

FIG. 11 is a diagram illustrating that the optimum division states of the input coding block shown in FIG. 10 are expressed using a tree structure.

Regarding QT division, the number of cases is two: QT division is not performed; and according to QT division, the block is divided into four partial blocks (namely, the width and the height are divided in ½). Therefore, the QT division information is expressed by 0 or 1. Regarding SBT division, the number of cases is three: SBT division is not performed; division into two blocks is performed in the horizontal direction; and division is performed in the vertical direction. Therefore, the SBT division information is expressed by 0, 1, or 2. Regarding ASBT division, the number of cases is five: ASBT division is not performed; division into ¼ size is performed in the horizontal direction; division into ¾ size is performed in the horizontal direction; division into ¼ size is performed in the vertical direction; and division into ¾ size is performed in the vertical direction. Therefore, the ASBT division information is expressed by 0, 1, 2, 3, or 4.

In FIG. 11, the QT division information and the BT division information are marked on each node of the tree structure.

On the basis of the above description, a method of controlling the number or types of intra prediction modes in the encoding/decoding block and of encoding/decoding that will be described in detail.

Figure 12:
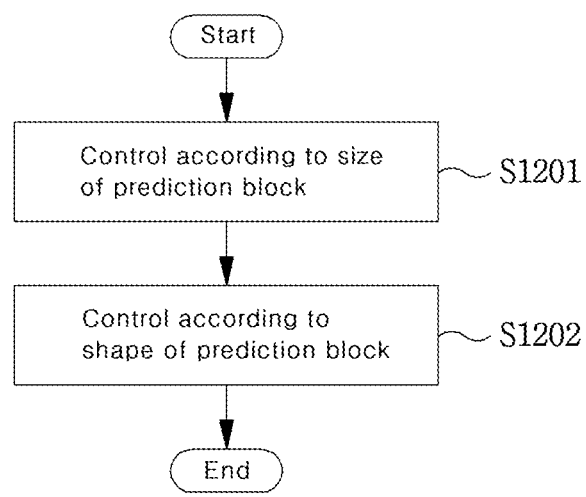
FIG. 12 is a flowchart illustrating a process of controlling the number or types of prediction modes by an apparatus for encoding.

FIG. 12 is a flowchart illustrating a process of controlling the number or types of prediction modes by an apparatus for encoding. In FIG. 12, the steps are shown as a series, but it is not necessary to perform the steps in the order shown. For example, when the result of determining the number or types of intra prediction modes of the prediction block has no influence, it is possible to change the order. For example, when there is no change in the number or types of intra prediction modes even though the order of the steps S1201 and S1202 is changed, it is possible to change the order thereof. Also, the steps shown in FIG. 12 may be partially omitted. For example, when the number or types of intra prediction modes are controlled regardless of the shape of the prediction block, the step S1202 is omitted.

In the embodiment, the current coding block may represent the prediction block, the coding block including the prediction block, or the like. Hereinafter, the present invention will be described in detail with reference to FIG. 12.

At step S1201, according to the size of the current coding block, shown is that the number or types of intra prediction modes may be controlled. Describing this in detail, the number of intra prediction modes available for the current coding block may be variably determined according to the size of the current coding block. For example, as the size of the current coding block increases, the number of intra prediction modes available for the current coding block increases. For example, assuming that the minimum size of the prediction block is 4×4 and the maximum size is 256×256, when the current coding block is equal to or larger than 4×4 and equal to or smaller than 32×32 in size, the number of intra prediction modes available for the current coding block is set to 35. When the current coding block is equal to or larger than 64×64 and equal to smaller than 256×256 in size, the number of intra prediction modes available for the current coding block is set to 67.

Conversely, as the size of the current coding block decreases, the number of intra prediction modes available for the current coding block increases. For example, assuming that the minimum size of the prediction block is 4×4 and the maximum size is 256×256, when the current coding block is equal to or larger than 4×4 and equal to or smaller than 32×32 in size, the number of intra prediction modes available for the current coding block is set to 67. When the current coding block is equal to or larger than 64×64 and equal to or smaller than 256×256 in size, the number of intra prediction modes available for the current coding block is set to 35. That is, when the size of the current coding block satisfies a predetermined size condition, the number of available intra prediction modes is set to N. The N is not limited to 35 or 67 described above, and may be an integer of one or more. For example, N may be four. The predetermined size condition may be determined by comparing the horizontal length and/or the vertical length of the current coding block to a predetermined threshold value. Alternatively, the predetermined size condition may be determined by comparing a value (the area) of width×length of the current coding block to the predetermined threshold value.

The number of intra prediction modes available for the current coding block may be determined according to the result of comparing the size of the current coding block to the criterion size. Here, the criterion size may be signaled over the upper-layer header, or may be derived from the apparatus for encoding and the apparatus for decoding under the same condition. For example, assuming that the criterion size is 32×32, information on the criterion size is defined as "log 232" by applying a logarithmic function and may be transmitted in the bitstream. As the size of the current coding block is smaller than or larger than the criterion size, the number of intra prediction modes available for the current coding block may increase. For example, when the current coding block is 32×32 in size, the number of intra prediction modes available for the current coding block is 19. When the current coding block is equal to or larger than 64×64 and equal to or smaller than 128×128 in size, the number of intra prediction modes available for the current coding block is 35. When the current coding block is 256×256 in size, the number of intra prediction modes available for the current coding block is 67. When the current coding block is equal to or smaller than 16×16 and is equal to or larger than 8×8 in size, the number of intra prediction blocks available for the current coding block is 35. When the current coding block is 4×4 in size, the number of intra prediction blocks available for the current coding block is 67.

Conversely, when the size of the current coding block is smaller than or larger than the criterion size, the number of intra prediction modes available for the current coding block may decrease. For example, when the current coding block is 32×32 in size, the number of intra prediction modes available for the current coding block is 67. When the current coding block is equal to or larger than 64×64 and equal to or smaller than 128×128 in size, the number of intra prediction modes available for the current coding block is 35. When the current coding block is 256×256 in size, the number of intra prediction modes available for the current coding block is 19. When the current coding block is equal to or smaller than 16×16 and is equal to or larger than 8×8 in size, the number of intra prediction blocks available for the current coding block is 35. When the size of the current coding block is 4×4, the number of intra prediction blocks available for the current coding block is 19.

Regardless of the size of the current coding block, the intra prediction mode available for the current coding block may include the non-directional intra prediction mode (or the non-angular prediction mode). That is, regardless of the size of the current coding block, the current coding block may be encoded using the non-directional intra prediction mode. In contrast, the number of directional prediction modes (namely, angular prediction modes) available for the current coding block may vary according to the size of the current coding block. As the number of intra prediction modes available for the current coding block decreases or increases, the number of directional prediction modes available for the current coding block also decreases or increases.

When the number of directional prediction modes available for the current coding block decreases, the current coding block may use a directional prediction mode on a per-integer basis or similar modes. Here, the directional prediction mode on a per-integer basis means a mode in which intra prediction is performed using a reference sample on a per-integer basis. Here, the reference sample on a per-integer basis may mean the reference sample itself rather than an additional reference sample generated by interpolation of the reference sample. For example, the intra prediction mode in horizontal direction, vertical direction, or diagonal direction may be the directional prediction mode on a per-integer basis.

Alternatively, the directional prediction modes available for the current coding block may be determined by dividing (N−1 sections) the entire directional prediction mode section by the number N of directional prediction mode to be used.

Figure 13:
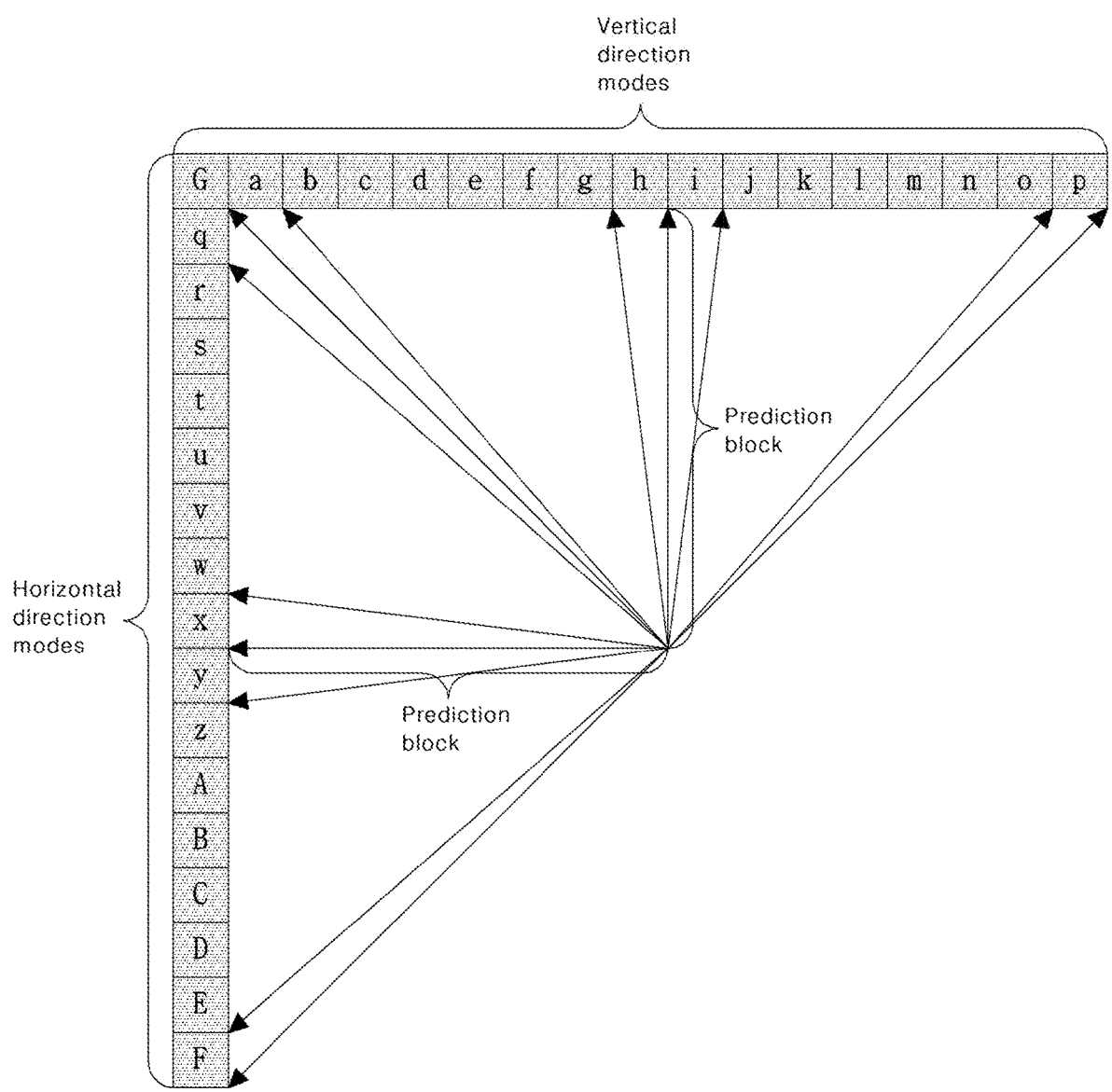
FIGS. 13 and 14 are diagrams illustrating examples of 13 directional prediction modes available in a current coding block.
Figure 14:
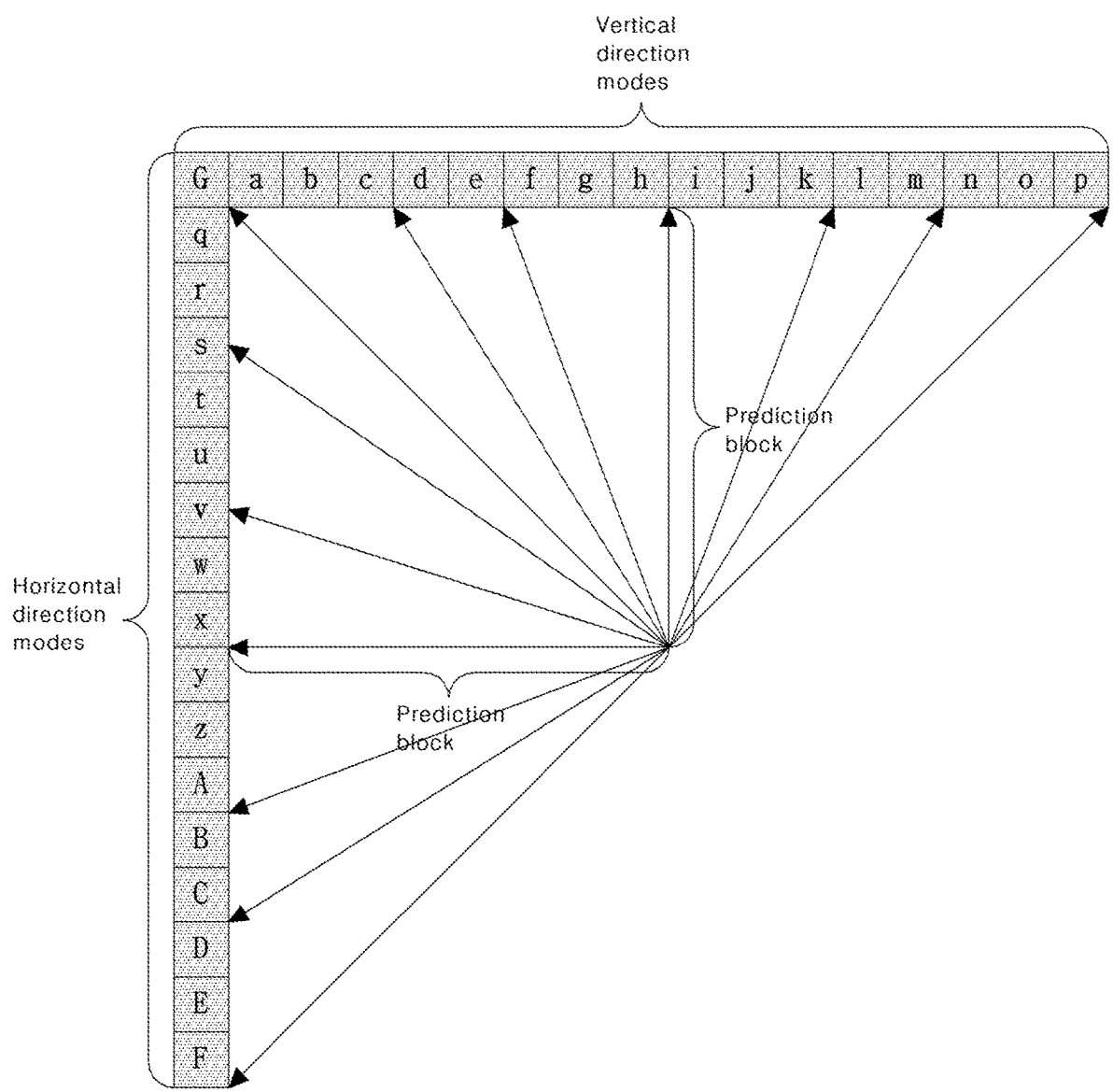

FIGS. 13 and 14 are diagrams illustrating examples of 13 directional prediction modes available in a current coding block.

Referring to FIG. 13, the intra prediction modes available for the current coding block may be the directional prediction mode on a per-integer basis, directional prediction modes adjacent to the directional prediction mode on a per-integer basis. For example, in FIG. 13, the intra prediction modes in three directions, such as vertical direction, horizontal direction, and diagonal direction, and intra prediction modes (intra prediction modes with offset of ±1) adjacent thereto are shown as the directional prediction modes available for the current coding block.

Referring to FIG. 14, the directional prediction modes available for the current coding block may be 13 directional prediction modes assigned at uniform intervals by dividing the entire directional prediction mode section into 12 equal parts.

When the number of intra prediction modes available for the current prediction block increases, more directional prediction modes on a per-integer basis and more intra prediction modes adjacent thereto are used, or the entire directional prediction mode section is divided into more parts.

Figure 15:
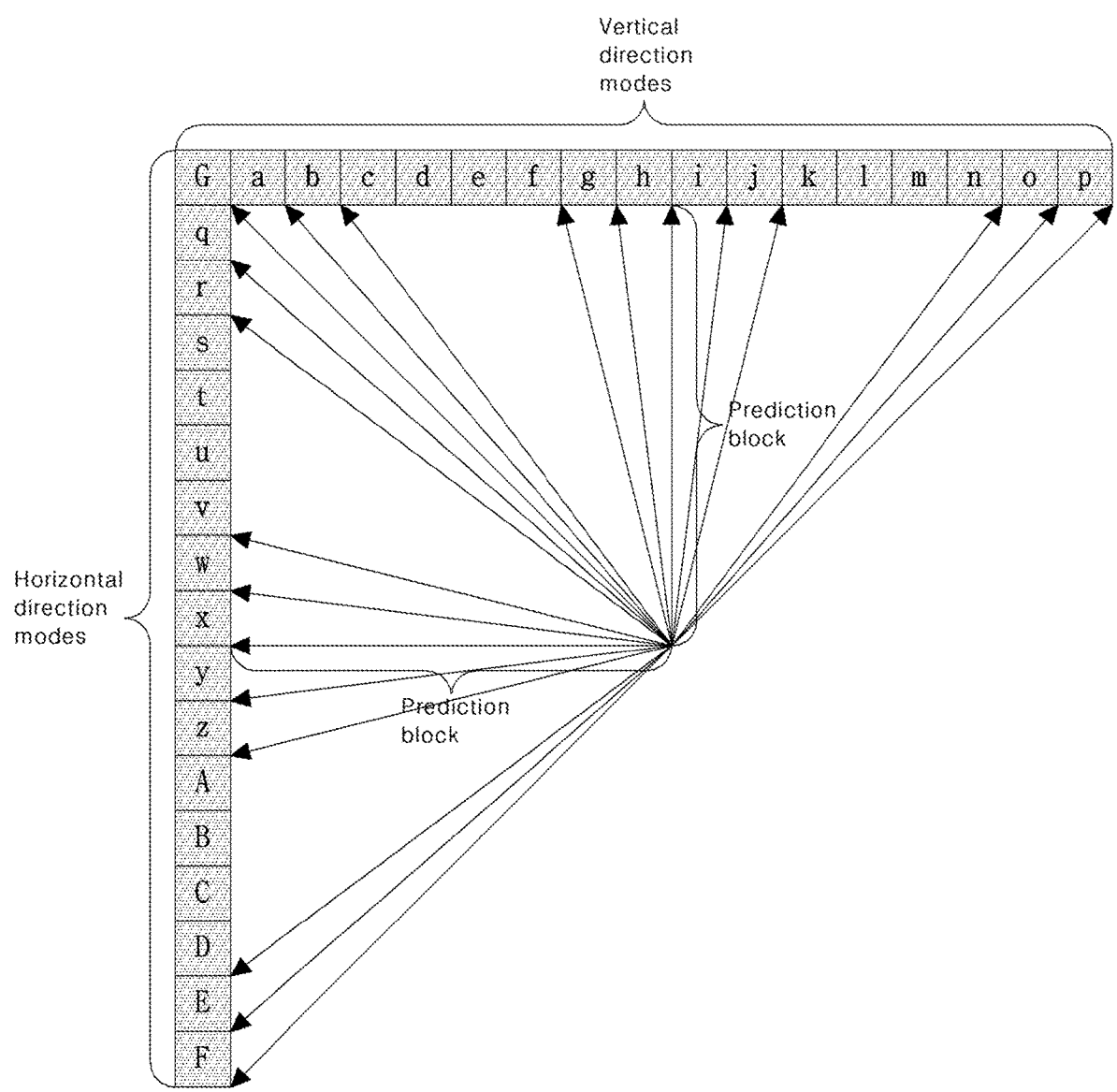
FIGS. 15 and 16 are diagrams illustrating examples of 21 directional prediction modes available in a current block.
Figure 16:
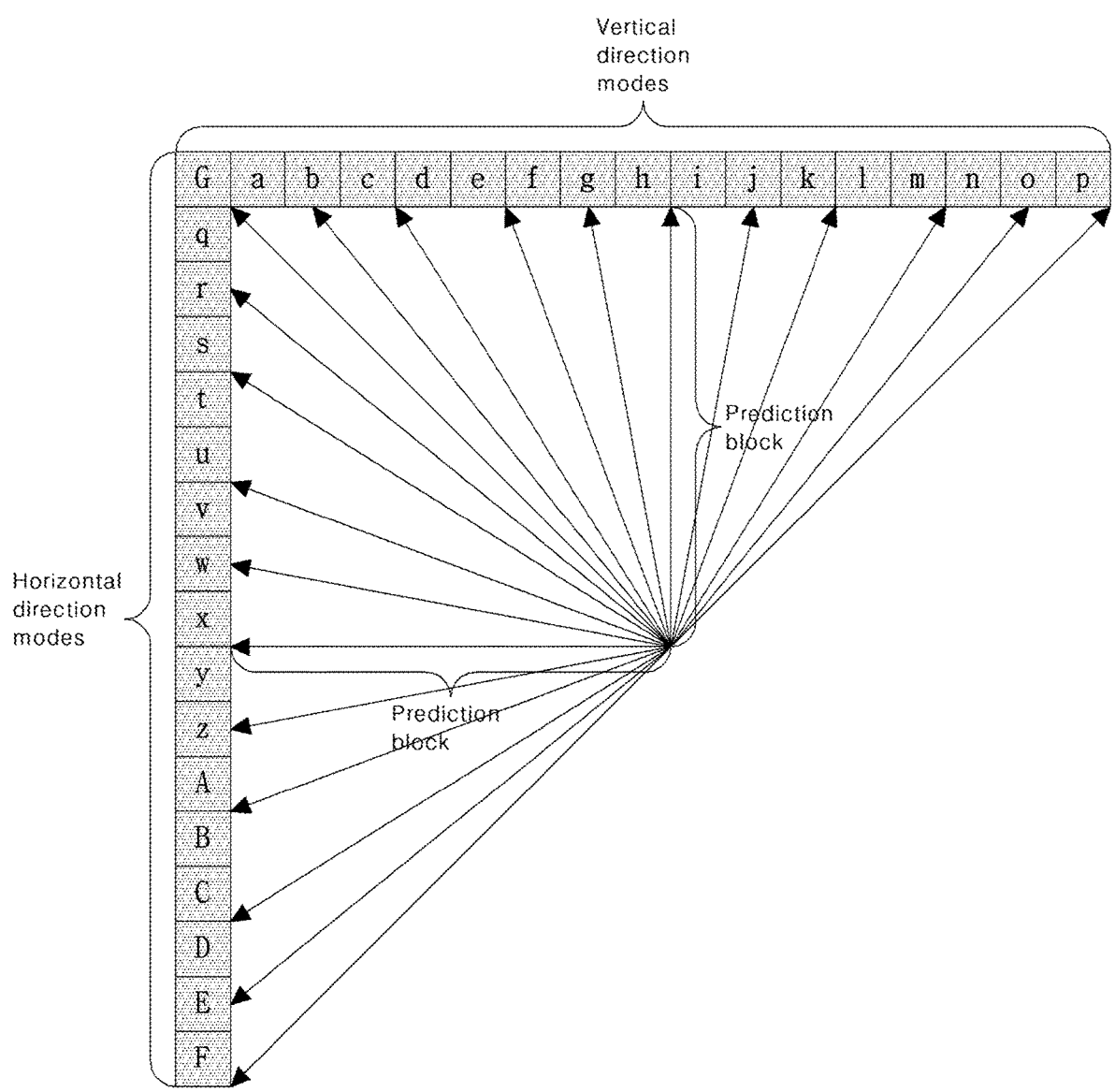

For example, FIGS. 15 and 16 are diagrams illustrating examples of 21 directional prediction modes available in a current block.

In FIG. 15, intra prediction modes in three directions, such as vertical direction, horizontal direction, and diagonal direction, and intra prediction modes (intra prediction modes with offset of ±2) adjacent thereto are shown as the intra prediction modes available for the current coding block.

In FIG. 16, the intra prediction modes available for the current coding block are 21 directional prediction modes assigned at uniform intervals by dividing the entire directional prediction mode section into 20 equal parts.

The apparatus for encoding may encode the number of available intra prediction modes for each size of the prediction block and may transmit the result to the apparatus for decoding. Here, information indicating the number of available intra prediction modes for each size of the prediction block may be encoded in the upper-layer header. For example, assuming that the minimum size of the prediction block is 4×4 and the maximum size is 256×256, when determining that the number of intra prediction modes available for the prediction block which is equal to or smaller than a 32×32 block is 64, a value (log 264) obtained by applying the logarithm to the number of available modes is encoded and is transmitted to the apparatus for decoding. When determining that the number of intra prediction modes available for a 64×64 prediction block is 32, a value (log 232) obtained by applying the logarithm to the number of available modes is encoded. When the number of intra prediction modes available for a 128×128 prediction block is 16, a value (log 216) obtained by applying the logarithm to the number of available modes is encoded. When the number of intra prediction modes available for a 256×256 prediction block is eight, a value (log 28) obtained by applying the logarithm to the number of available modes is encoded.

As another example, in the upper-layer header, the number of intra prediction modes available for each size of the prediction block may be preset, the number of optimum intra prediction modes for each prediction block may be determined, and index information indicating the number of available intra prediction modes on a per-prediction block basis may be encoded. For example, when the number of intra prediction modes available for a 32×32 prediction block is 19, 35, or 67, index information indicating which of 19, 35, and 67 is optimum for the 32×32 prediction block is encoded.

The apparatus for encoding may encode information indicating whether to adjust the number or types of intra prediction modes according to the size of the prediction block. The encoded information may be transmitted to the apparatus for decoding over the upper-layer header. Here, the information may be a one-bit flag, but it is not limited thereto. The apparatus for decoding may determine in advance, on the basis of the flag information, whether or not the number or types of intra prediction modes are adjusted for each size of the prediction block.

Even though the information encoded in the upper-layer header indicates that the number of available intra prediction modes is adjusted according to the size of the prediction block, the current coding block is subjected to intra prediction by a conventional method or by adjusting the number of available intra prediction modes according to the size of the prediction block. Accordingly, when the information encoded in the upper-layer header indicates that the number of available intra prediction modes is adjusted according to the size of the prediction block, the apparatus for encoding may further encode, on a per-prediction block basis, information indicating whether the relevant prediction block is encoded using the conventional method (namely, using the fixed number of intra prediction modes) or using a method of adjusting the number of available intra prediction modes according to the size of the prediction block. Here, the encoded information may be a one-bit flag, but it is not limited thereto.

At step S1202, it is described that the number or types of intra prediction modes is controlled according to the shape of the current coding block. Describing this in detail, the number of intra prediction modes available for the current coding block may be variably determined according to the shape of the current coding block. For example, when the current coding block is in a non-square shape (for example, a rectangular shape), the current coding block is set to use more intra prediction modes in the horizontal direction than intra prediction modes in the vertical direction, or use more intra prediction modes in the vertical direction than intra prediction modes in the horizontal direction.

Specifically, when the current coding block is in a non-square shape, the number of intra prediction modes in the horizontal direction and intra prediction modes in the vertical direction that are available for the current block is determined according to a ratio of the width to the height of the current coding block. For example, when the current coding block is 8×16 in size, the height of the current coding block is two times longer than the width. Therefore, the number of intra prediction modes in the horizontal direction available for the current coding block is about two times larger than the number of intra prediction modes in the vertical direction. For example, when the number of intra prediction modes with directionality available for the current coding block is 25, the current coding block is set to use 16 horizontal direction intra prediction modes and 9 vertical direction intra prediction modes. That is, when the current coding block is in a square shape, the number of intra prediction modes in the horizontal direction available for the current coding block is the same as the number of intra prediction modes in the vertical direction. When the current coding block is a rectangle long in the vertical direction, the number of intra prediction modes in the horizontal direction available for the current coding block is larger than the number of intra prediction modes in the vertical direction. Further, when the current coding block is a rectangle long in the horizontal direction, the number of intra prediction modes in the vertical direction available for the current coding block is larger than the number of intra prediction modes in the horizontal direction. For example, when the current coding block is a rectangle long in the vertical direction, indexes of M modes that are not used among the intra prediction modes in the vertical direction are diverted to indexes of M modes that are additionally available among the intra prediction modes in the horizontal direction. The M may vary depending on a ratio of the width to the height of the current coding block.

The number of intra prediction modes available for the current coding block may be determined by comparing the width or height of the current coding block to a preset threshold value. Here, the threshold value may be signaled over the upper-layer header. For example, a value (Log 2) obtained by applying the logarithm to the threshold value may be signaled over the upper-layer header. Alternatively, the apparatus for encoding and the apparatus for decoding may derive the threshold value under the same condition. Here, threshold values may set for each of the width and height, or the same value may be used for the width and height. For example, when the threshold value of the width is 32 and the width of the current coding block is smaller than the threshold value, the current coding block uses only ½N among the number N of intra prediction modes in the horizontal direction. For example, when the number of directional prediction modes in horizontal direction is 33, the current coding block uses 17 directional prediction modes in horizontal direction.

Regardless of the shape of the current coding block, the intra prediction mode available for the current coding block may include the non-directional intra prediction mode (or the non-angular prediction mode). In contrast, the number of directional prediction modes (namely, angular prediction modes) available for the current coding block may vary according to the shape of the current coding block. As the number of intra prediction modes available for the current coding block decreases or increases, the number of directional prediction modes available for the current coding block also decreases or increases.

The directional prediction modes available for the current coding block may be determined to be the directional prediction mode on a per-integer basis or similar modes. Alternatively, the directional prediction modes available for the current coding block may be determined by dividing (N−1 sections) the entire directional prediction mode section by the number N of directional prediction modes to be used. This has been described with reference to FIGS. 13 to 16 above, and the detailed description thereof will be omitted.

The apparatus for encoding may encode information indicating whether to adjust the number or types of intra prediction modes according to the shape of the prediction block. The encoded information may be transmitted to the apparatus for decoding over the upper-layer header. Here, the information may be a one-bit flag, but it is not limited thereto. The apparatus for decoding may determine in advance, on the basis of the flag information, whether or not the number or types of intra prediction modes are adjusted for each shape of the prediction block.

Even though the information encoded in the upper-layer header indicates that the number of available intra prediction modes is adjusted according to the shape of the prediction block, the current coding block is subjected to intra prediction by a conventional method or by adjusting the number of available intra prediction modes according to the shape of the prediction block. Accordingly, when the information encoded in the upper-layer header indicates that the number of available intra prediction modes is adjusted according to the shape of the prediction block, the apparatus for encoding may further encode, on a per-prediction block basis, information indicating whether the relevant prediction block is encoded using the conventional method (namely, using the fixed number of intra prediction modes) or using a method of adjusting the number of available intra prediction modes according to the shape of the prediction block. Here, the encoded information may be a one-bit flag, but it is not limited thereto.

FIG. 12 mainly describes the encoding process, and in the decoding process, it is possible that the number of intra prediction modes available for the current decoding target block is adjusted. The apparatus for decoding may adjust, on the basis of the information signaled in the bitstream, the number of available intra prediction modes for the current decoding block by taking the size, shape of the current decoding block, or a pattern of using the intra prediction mode of the neighboring block into consideration.

When the number of intra prediction modes available for the current coding block is determined, the apparatus for encoding determines the intra prediction mode of the current coding block among the intra prediction modes available for the current coding block, and encodes information thereon. Hereinafter, a method of encoding/decoding the intra prediction mode for the current block will be described in detail.

Figure 17:
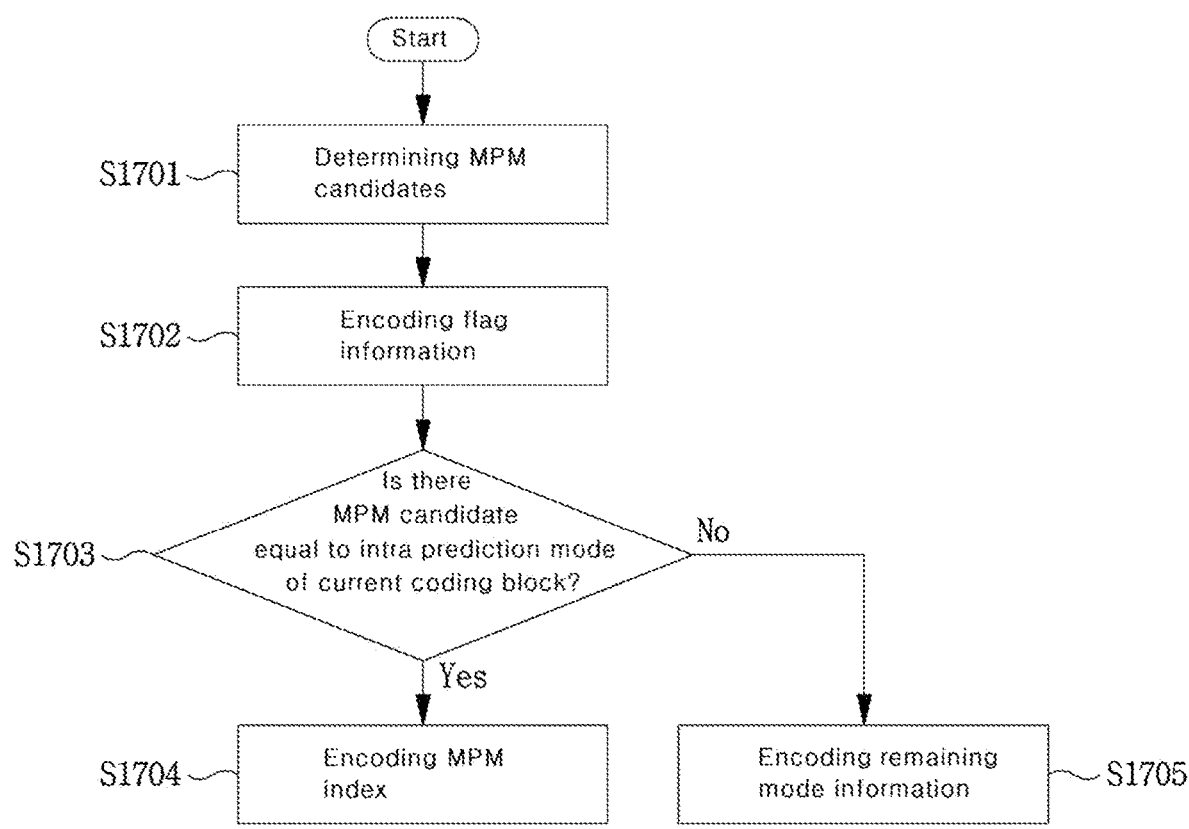
FIG. 17 is a flowchart illustrating a process of encoding an optimum intra prediction mode for a current coding block.

FIG. 17 is a flowchart illustrating a process of encoding the optimum intra prediction mode for a current coding block.

Referring to FIG. 17, first, the apparatus for encoding may determine MPM candidates for the current coding block at step S1701. Here, the apparatus for encoding may set, with respect to the directional prediction mode, the quantized directional prediction mode (or the angle of the quantized directional prediction mode) as the MPM candidate by taking into consideration that the number of directional prediction modes available for the current coding block is different from that of directional prediction modes available for the neighboring blocks of the current coding block.

For example, FIG. 18 is a diagram illustrating an example of setting MPM candidates. In FIG. 18, illustrated is that three MPM candidates are used. In the example shown in FIG. 18, L may be the intra prediction mode with the highest occurrence frequency among the neighboring blocks adjacent to the left of the current coding block, or may be the intra prediction mode of the neighboring block (or an arbitrary neighboring block) at a predetermined position adjacent to the left of the current coding block. A may be the intra prediction mode with the highest occurrence frequency among the neighboring blocks adjacent to the top of the current coding block, or may be the intra prediction mode of the neighboring block (or an arbitrary neighboring block) at a predetermined position adjacent to the top of the current coding block.

The L, L−1, L+1, and A may indicate indexes of intra prediction modes. However, when the number of directional prediction modes available for the current coding block is different from the number of directional prediction modes available for the neighboring block, it is possible that the directional prediction mode used by the neighboring block cannot used by the current coding block. For example, among the intra prediction modes available for the current coding block, the mode 18 means a prediction mode in the horizontal direction, while among the directional prediction modes available for the neighboring block, the mode 18 means the prediction mode in the top left direction rather than in the horizontal direction.

In order to solve this mismatch, when the non-directional prediction mode is assigned to the MPM candidate, index information is intactly used. When the directional prediction mode is assigned to the MPM candidate, a prediction angle corresponding to the directional prediction mode is assigned. As a quantized angle is set as the MPM candidate, the apparatus for encoding determines the intra prediction mode of the current coding block on the basis of whether the prediction angle of the optimum directional prediction mode for the current coding block is equal to the quantization angle included in the MPM candidate. Accordingly, when the MPM candidates are the non-directional prediction modes, the indexes of the intra prediction modes, such as L, L−1, L+1, A, and the like are used as the MPM candidates. In contrast, when the MPM candidates are the directional prediction modes, the angles of the intra prediction mode, such as L', (L−1)', (L+1)', A', and the like are used as the MPM candidates.

When the current coding block is incapable of using the directional prediction mode corresponding to the prediction angle of the neighboring block, it is possible to perform quantization that reduces the prediction angle of the neighboring block to the one that is most similar to the prediction angle of the directional mode available for the current prediction block. Accordingly, when the MPM candidates are the directional prediction modes, the MPM candidates that represent the quantized angles of the directional prediction modes, such as L', (L−1)', (L+1)', A', and the like, are used. For example, when the directional mode of the neighboring block is one among the intra prediction modes in the horizontal direction, the directional mode of the neighboring block is quantized into the intra prediction mode in the horizontal direction and is included in the MPM list as the MPM candidate of the current coding block. When the directional mode of the neighboring block is one among the intra prediction modes in the vertical direction, the directional mode of the neighboring block is quantized in to the intra prediction mode in the vertical direction and is included in the MPM list as the MPM candidate of the current coding block.

Figure 19:
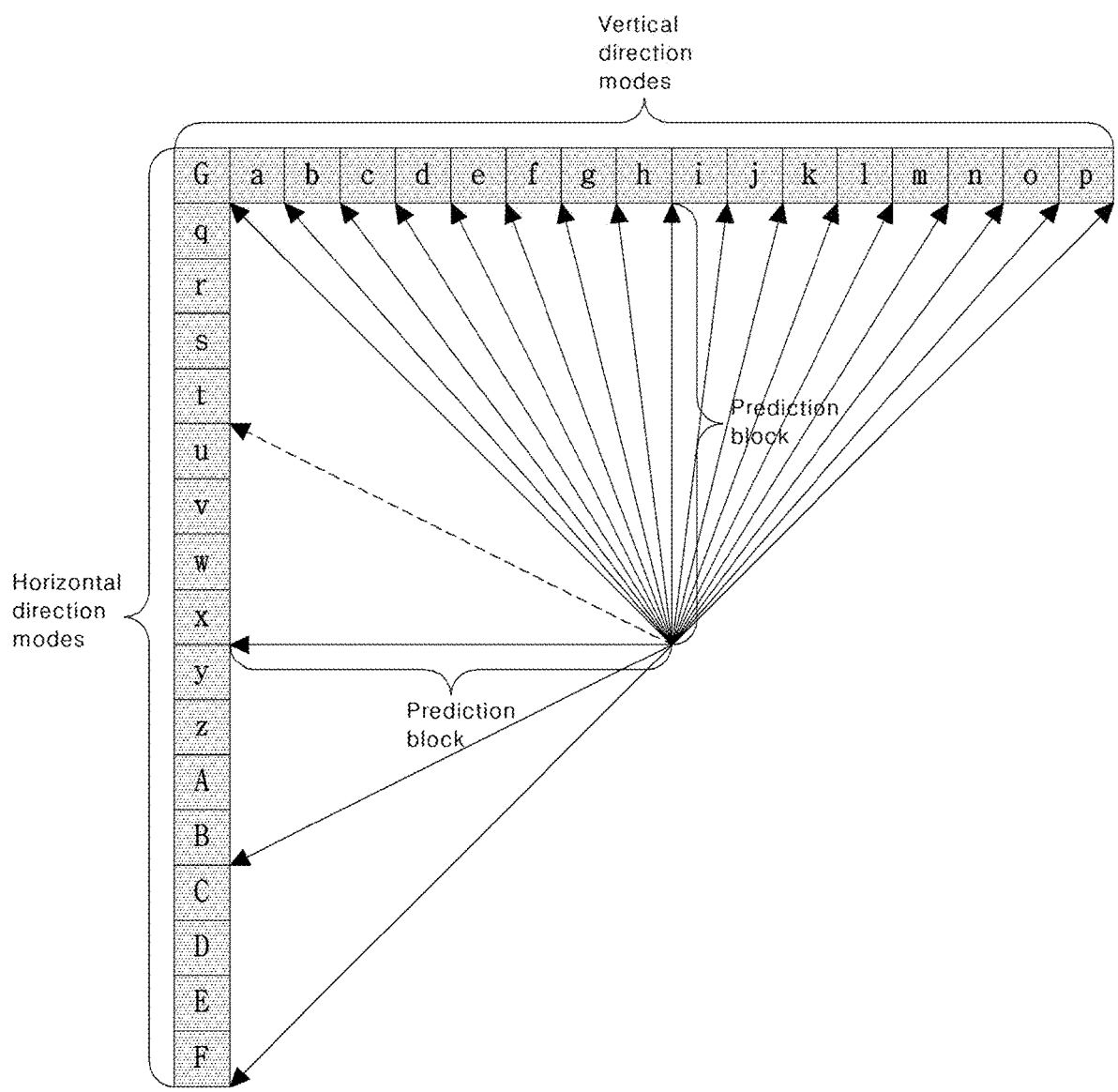
FIGS. 19 and 20 are diagrams illustrating examples of quantizing a prediction angle.
Figure 20:
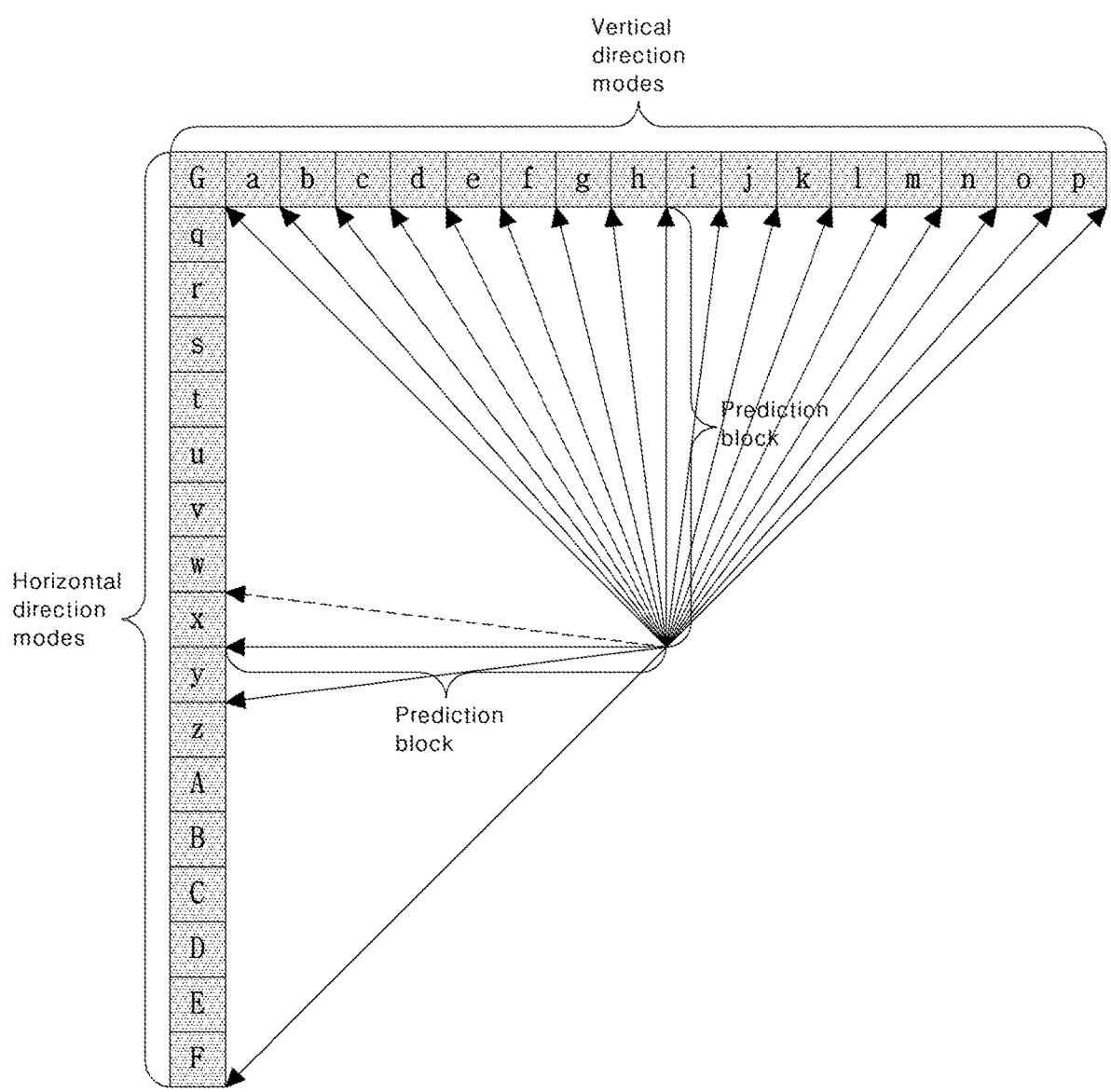

For example, FIGS. 19 and 20 are diagrams illustrating examples of quantizing a prediction angle. FIG. 20 shows the directional prediction modes available for the neighboring blocks close to the current coding block, and FIG. 19 shows the directional prediction modes available for the current coding block. Comparing FIG. 19 and FIG. 20, it is found that the directional prediction mode indicated by the broken line in FIG. 20 is unavailable for the current coding block. Accordingly, when the neighboring block is encoded using the directional prediction mode indicated by the broken line, the prediction angle of the directional prediction mode indicated by the broken line is transformed into the prediction angle of the most similar prediction mode among the directional prediction modes available for the current block and the transformed angle is set to the MPM candidate.

In the above embodiment, described is that the prediction angle is set as the MPM candidate for the directional prediction mode by taking into consideration that the number of intra prediction modes available for the current coding block is different from the number of intra prediction modes available for the neighboring blocks.

As another example, when the number of intra prediction modes available for the current coding block is equal to the number of intra prediction modes available for the neighboring blocks, the MPM candidate also indicates the index of the intra mode with respect to the directional prediction mode. Alternatively, even when the number of intra prediction modes available for the current coding block is different from the number of intra prediction modes available for the neighboring blocks, the MPM candidate is set to indicate the index of the intra prediction mode with respect to the directional prediction mode. In this case, the directional prediction mode of the close block may be quantized (or transformed) into the index of the mode with the most similar direction among the directional prediction mod s available for the current block.

In the embodiment with respect to FIG. 18, the MPM candidate may be derived on the basis of the intra prediction mode of the neighboring block which is not adjacent to the current coding block according to the size, shape, or the decoded state of the current coding block or of the neighboring block adjacent to current coding block.

Figure 21:
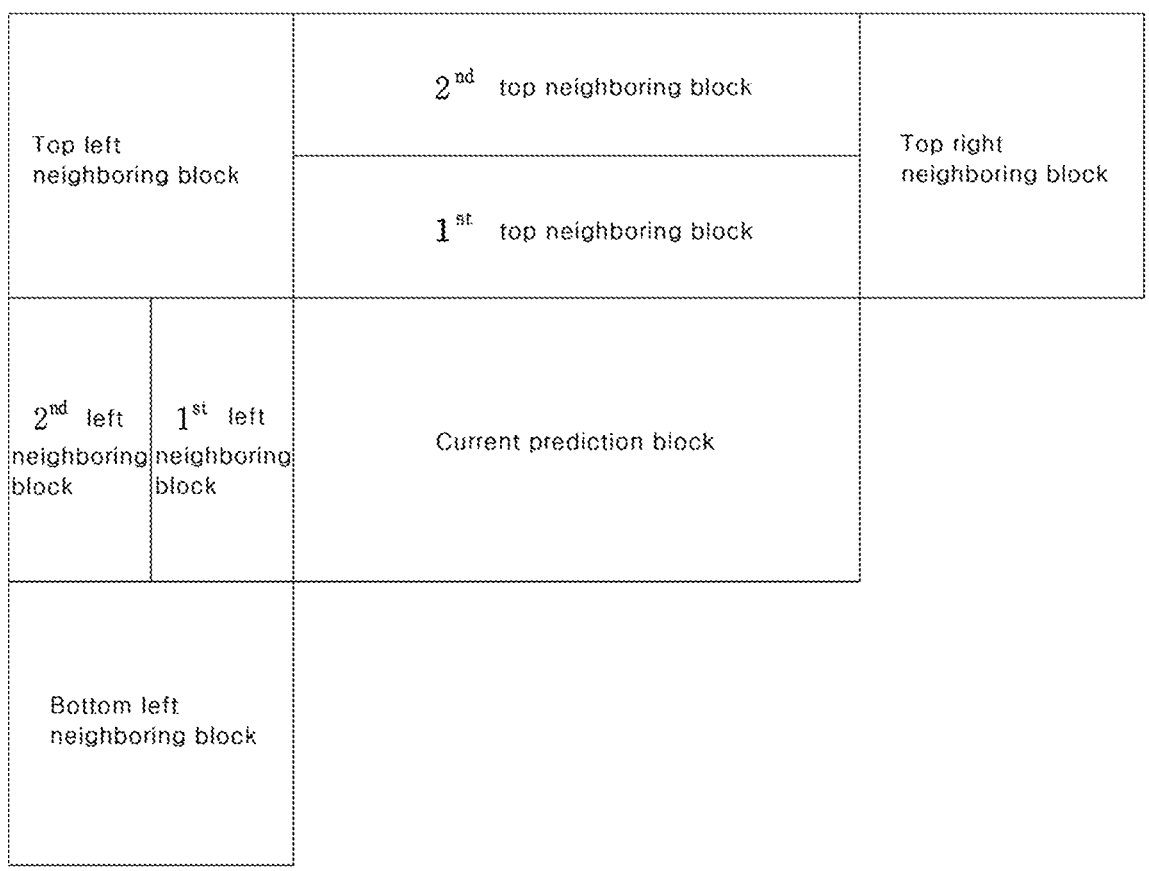
FIG. 21 is a diagram illustrating an example of deriving MPM candidates from neighboring blocks that are not adjacent to the current coding block.

For example, FIG. 21 is a diagram illustrating an example of deriving MPM candidates from neighboring blocks that are not adjacent to the current coding block.

When the height of each of the top neighboring blocks, which are successive non-square blocks (for example, blocks in a rectangular shape of which the width is longer than the height) in the top direction from the current coding block, adjacent to the current coding block is shorter than the height of the current coding block, the apparatus for encoding predicts that the intra prediction mode of the top neighboring block is different from the intra prediction mode of the current coding block. Alternatively, when the intra prediction mode of the neighboring block adjacent to the top of the current coding block is one of vertical direction prediction modes, the apparatus for encoding predicts that the intra prediction mode of the top neighboring block is different from the intra prediction mode of the current coding block.

In this case, the apparatus for encoding may consider deriving the additional MPM candidate from at least one among blocks adjacent to the current coding block, namely, the left, the top left, the top right, and the bottom left neighboring blocks. Alternatively, the apparatus for encoding may derive the additional MPM candidate from the blocks adjacent to the neighboring blocks rather than adjacent to the current coding block. For example, in the example shown in FIG. 21, the apparatus for encoding may derive the MPM candidate on the basis of the second top block (namely, the 2nd top block) or the block more further to the top instead of the block adjacent to the top of the current coding block (namely, the 1st top block). Alternatively, the apparatus for encoding may consider the MPM candidate only using the intra prediction mode of the neighboring block in a specific direction rather than the top direction.

Also, when the width of each of the left neighboring blocks, which are successive non-square blocks (for example, blocks in a rectangular shape of which the height is longer than the width) in the left direction from the current coding block, adjacent to the current coding block is shorter than the width of the current coding block, the apparatus for encoding predicts that the intra prediction mode of the left neighboring block is different from the intra prediction mode of the current coding block. Alternatively, when the intra prediction mode of the neighboring block adjacent to the left of the current coding block is one of the horizontal direction prediction modes, the apparatus for encoding predicts that the intra prediction mode of the left neighboring block is different from the intra prediction mode of the current coding block.

In this case, the apparatus for encoding may consider deriving the additional MPM candidate from at least one among blocks adjacent to the current coding block, namely, the top, the top left, the top right, and the bottom left neighboring blocks. Alternatively, the apparatus for encoding may derive the additional MPM candidate from the blocks adjacent to the neighboring blocks rather than the blocks adjacent to the current coding block. For example, in the example shown in FIG. 21, the apparatus for encoding may derive the MPM candidate on the basis of the second left block (namely, the 2nd left block) or the block more further to the left instead of the block adjacent to the left of the current coding block (namely, the 1st left block). Alternatively, the apparatus for encoding may consider the MPM candidate only using the intra prediction mode of the neighboring block in a specific direction rather than the left direction.

When the MPM candidates of the current coding block are determined, the intra prediction mode of the current coding block is compared to the MPM candidates and whether there is the MPM candidate the same as the intra prediction mode of the current coding block is determined. According to the result of the determination, the apparatus for encoding may encode information indicating whether there is the MPM candidate the same as the intra prediction mode of the current coding block at step S1702. For example, when there is the MPM candidate the same as the intra prediction mode of the current coding block, the information is encoded as true. When there is no MPM candidate the same as the intra prediction mode of the current coding block, the information is encoded as false.

When determining that there is the MPM candidate the same as the intra prediction mode of the current coding block at step S1703, the apparatus for encoding may encode index information specifying the MPM candidate the same as the intra prediction mode of the current coding block among the MPM candidates at step S1704.

In contrast, when determining that there is no MPM candidate the same as the intra prediction mode of the current coding block at step S1703, the apparatus for encoding encode the intra prediction mode which is optimum for the current coding block among the intra prediction modes except for the intra prediction modes set as the MPM candidates at step S1705. Specifically, from all intra prediction modes available for the current coding block, the intra prediction modes set as the MPM candidates are excluded, and then sufficient bits to express the remaining intra prediction modes are assigned so that among the remaining prediction modes, information corresponding to the intra prediction mode of the current coding block is encoded.

When assigning bits in encoding the remaining intra prediction modes, sufficient bits to express the remaining intra prediction modes are fixedly assigned. Alternatively, the remaining intra prediction modes are divided into N groups and bits assigned to respective groups are differently set. For example, when the number of intra prediction modes available for the current coding block is 67 and the number of MPM candidates is 6, the number of the remaining intra prediction modes is 61. Here, when dividing the remaining intra prediction modes into two groups A and B, 16 intra prediction modes are assigned to the group A and 45 intra prediction modes are assigned to the group B. Here, flag information indicating to which group the intra prediction mode of the current coding block belongs may be encoded. By assigning four bits to the group A, the intra prediction modes of the current coding block are encoded. The group B is further divided into two sub groups B-1 and B-2. 19 intra prediction modes are assigned to the group B-1, and 26 intra prediction modes are assigned to the group B-2. By assigning five bits to the group B-1 and six bits to the group B-2, the intra prediction modes of the current coding block are encoded. The encoded information may be encoded and transmitted to the apparatus for decoding in the bitstream.

Next, decoding intra prediction mode of the current decoding block by the apparatus for decoding will be described.

Figure 22:
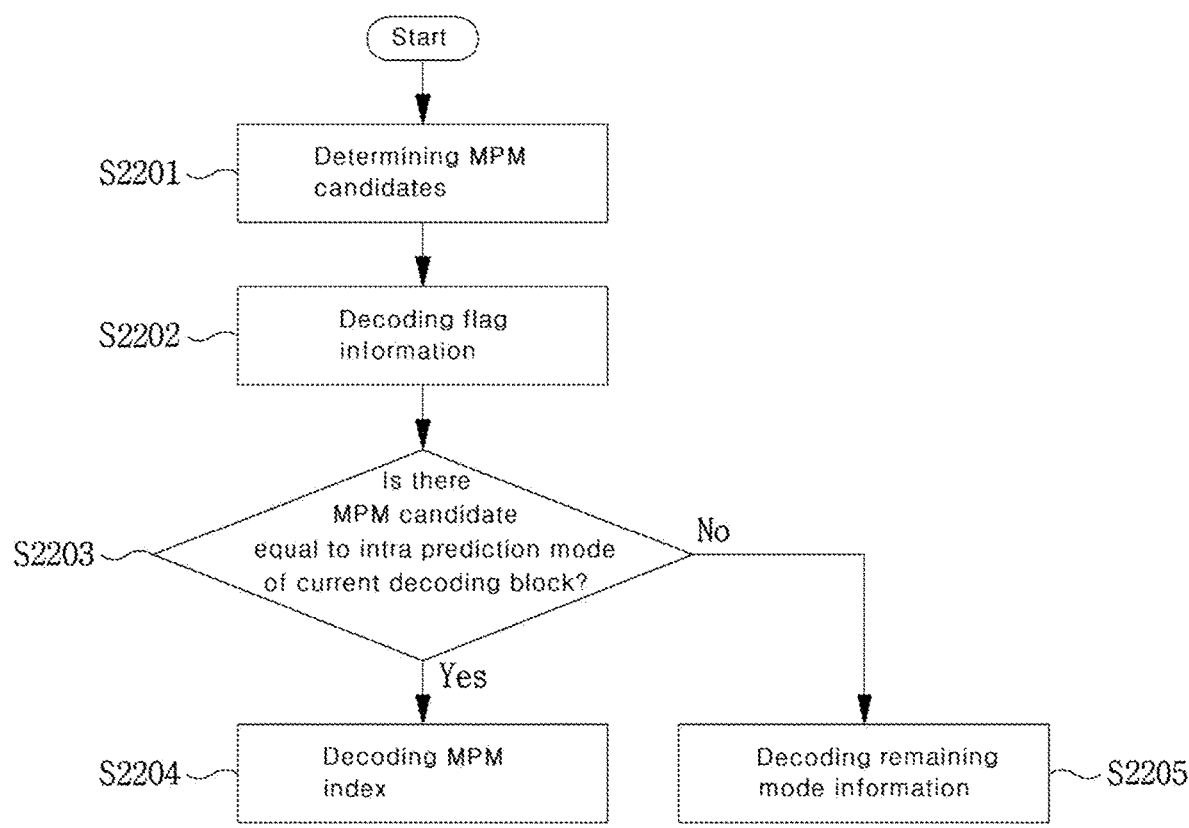
FIG. 22 is a flowchart illustrating a process of decoding an intra prediction mode for a current decoding block.

FIG. 22 is a flowchart illustrating a process of decoding an intra prediction mode for a current decoding block.

Referring to FIG. 22, first, the apparatus for decoding may determine the MPM candidates for the current decoding block at step S2201. As in the encoding process described above, the apparatus for decoding may determine the MPM candidates for the current decoding block by taking the intra prediction mode of the blocks close to the current decoding block into consideration.

Next, the apparatus for decoding may decode, from the bitstream, information indicating whether there is the MPM candidate the same as the intra prediction mode of the current decoding block among the MPM candidates at step S2202. The information may be a one-bit flag, but it is not limited thereto.

On the basis of the information, when determining that there is the MPM candidate the same as the intra prediction mode of the current decoding block at step S2203, the apparatus for decoding may decode the index information specifying the MPM candidate the same as the intra prediction mode of the current decoding block among the MPM candidates at step S2204.

In contrast, when determining that there is no MPM candidate the same as the intra prediction mode of the current decoding block at step S2203, the apparatus for decoding decodes the remaining prediction mode information indicating the optimum prediction mode for the current decoding block among the remaining intra prediction modes excluding the intra prediction modes set as the MPM candidates at step S2205.

In the above embodiment, the MPM candidates are used to determine the intra prediction mode of the current coding/decoding block, but the intra prediction mode of the current coding/decoding block may be determined without using the MPM candidates. In this case, information specifying the intra prediction mode of the current coding/decoding block may be transmitted to the apparatus for decoding in the bitstream.

The coding block may be divided into one or more prediction blocks, and each prediction block may be divided into one or more partial blocks (or partial prediction blocks) through an additional division process. Here, the partial blocks may be decoded using different intra prediction modes. Accordingly, the prediction block may be encoded/decoding using multiple intra prediction modes. As described above, encoding/decoding the prediction block using two or more intra prediction modes is referred to as encoding/decoding the prediction block using "multiple intra prediction modes".

Hereinafter, an example of encoding/decoding the current block in multiple intra prediction modes will be described in detail.

Figure 23:
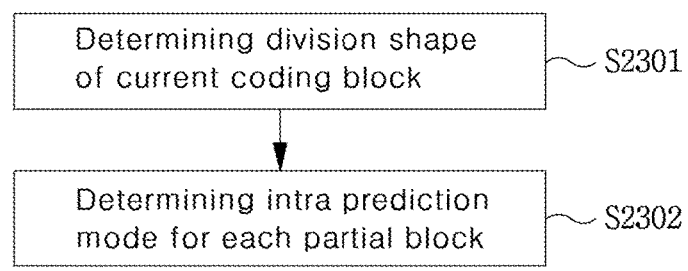
FIG. 23 is a diagram illustrating an example of determining an optimum division shape for a current coding block.

FIG. 23 is a diagram illustrating an example of determining an optimum division shape for a current coding block. One or more prediction blocks may be included in the coding block. In the embodiment, the current coding block may mean one of the prediction blocks included in the coding block. In the embodiment, the block generated by dividing the current coding block is referred to as "a partial block".

The apparatus for encoding may determine the optimum partial block division shape for the current coding block. Specifically, the apparatus for encoding may perform RDO on all division shapes available for the current coding block, and then may determine the optimum division shape. The division shape available for the current coding block may be preset in the apparatus for encoding and the apparatus for decoding.

Figure 24:
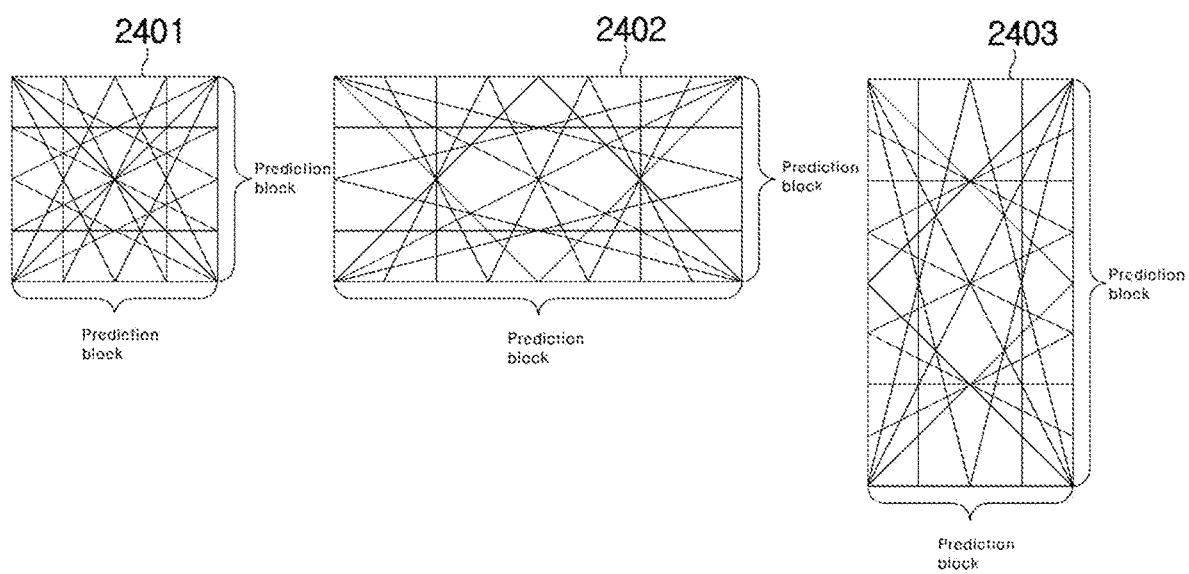
FIG. 24 is a diagram illustrating examples of division shapes available for a current coding block.

For example, FIG. 24 shows examples of division shapes that the current coding block may use.

In FIG. 24 the block 2401 shows an example of the division shape when the current coding block is in a square shape, and the blocks 2402 and 2403 show examples of the division shapes when the current coding block is a non-square shape.

The current coding block may be divided into multiple partial blocks on the basis of at least one of straight lines present in the block 2401, 2402, or 2403.

As shown in the examples in FIG. 24, the division line that divides the current coding block into multiple regions may be a straight line which is parallel or perpendicular to the width or height of the current coding block, or may be a straight line which defines an acute angle or obtuse angle to the width or height of the current coding block. In the examples shown in FIG. 24, 18 division lines are present in the block 2401 (namely, there are 18 division shapes), 20 division lines are present in the blocks 2402 and 2403 (namely, there are 20 division shapes). However, the division shapes of the current coding block are not limited to the described examples. The current coding block may be divided into multiple partial blocks by a straight line or a diagonal line not described in the examples.

According to the examples shown in FIG. 24, the current coding block may be divided into partial blocks in a rectangular shape, a triangular or trapezoid shape, or the like.

The apparatus for encoding may assign, with respect to the multiple division shapes available for the current coding block, the intra prediction mode of each partial block, and may determine the division shape in which the RD cost value is the minimum through RDO as the optimum division shape for the current coding block at step S2301. Here, the apparatus for encoding may adjust the number or types of available division shapes according to the size or shape of the current coding block. For example, as the size of the current coding block increases, the number of division shapes available for current coding block decreases. That is, only when the size and/or the shape of the current coding block satisfies a predetermined condition, a predetermined division shape is possible. For example, division in a triangular shape is possible only when the size or the area of the current coding block is equal to or larger than 8×8. Further, information required for signaling the various division shapes shown in FIG. 24 may be encoded. For example, when the current coding block is diagonally divided and two triangular blocks are generated, information indicating that the diagonal division direction is one of two diagonal division directions is signaled.

The apparatus for encoding may determine the intra prediction mode of each partial block at step S2302. Specifically, the apparatus for encoding may assign, with respect to the multiple division shapes available for the current coding block, the intra prediction mode of each partial block, and then may determine the intra prediction mode in which the RD cost value is the minimum through RDO as the optimum intra prediction mode for each partial block.

When determining the intra prediction mode of each partial block, the apparatus for encoding calculates the RD cost value through RDO by applying all available intra prediction modes to the partial block, and determine the intra prediction mode in which the RD cost value is the minimum as the intra prediction mode of the partial block. As another example, the apparatus for encoding may calculate the RD cost value through RDO by applying some of all available intra prediction modes to the partial block, and may determine the intra prediction mode in which the RD cost value is the minimum as the intra prediction mode of the partial block. Here, some intra prediction modes applicable to the partial block may be equally set in the apparatus for encoding and the apparatus for decoding.

As another example, some intra prediction modes may include at least one among the intra prediction mode of the neighboring block adjacent to the current coding block and a preset additional intra prediction mode. For example, when the intra prediction mode of the neighboring block is the non-directional mode, RDO is performed using all non-directional modes, some directional prediction modes with high selection frequency (for example, the vertical direction prediction mode, the horizontal direction prediction mode, and the like), and the like as candidates. Alternatively, when the intra prediction mode of the neighboring block is the directional mode, RDO is performed using all non-directional prediction modes, the intra prediction mode of the neighboring block, the intra prediction mode with similar direction to the intra prediction mode of the neighboring block (for example, the intra prediction mode having a difference from the intra prediction mode of the neighboring block equal to or smaller than a threshold value), and the like as candidates.

The apparatus for encoding may perform intra prediction on the current coding block using the intra prediction mode for each partial block. Here, when the current coding block is divided by a diagonal line, the division line does not correspond to the pixel boundary so that overlap pixels (namely, overlapped regions) between partial blocks occur.

Figure 25:
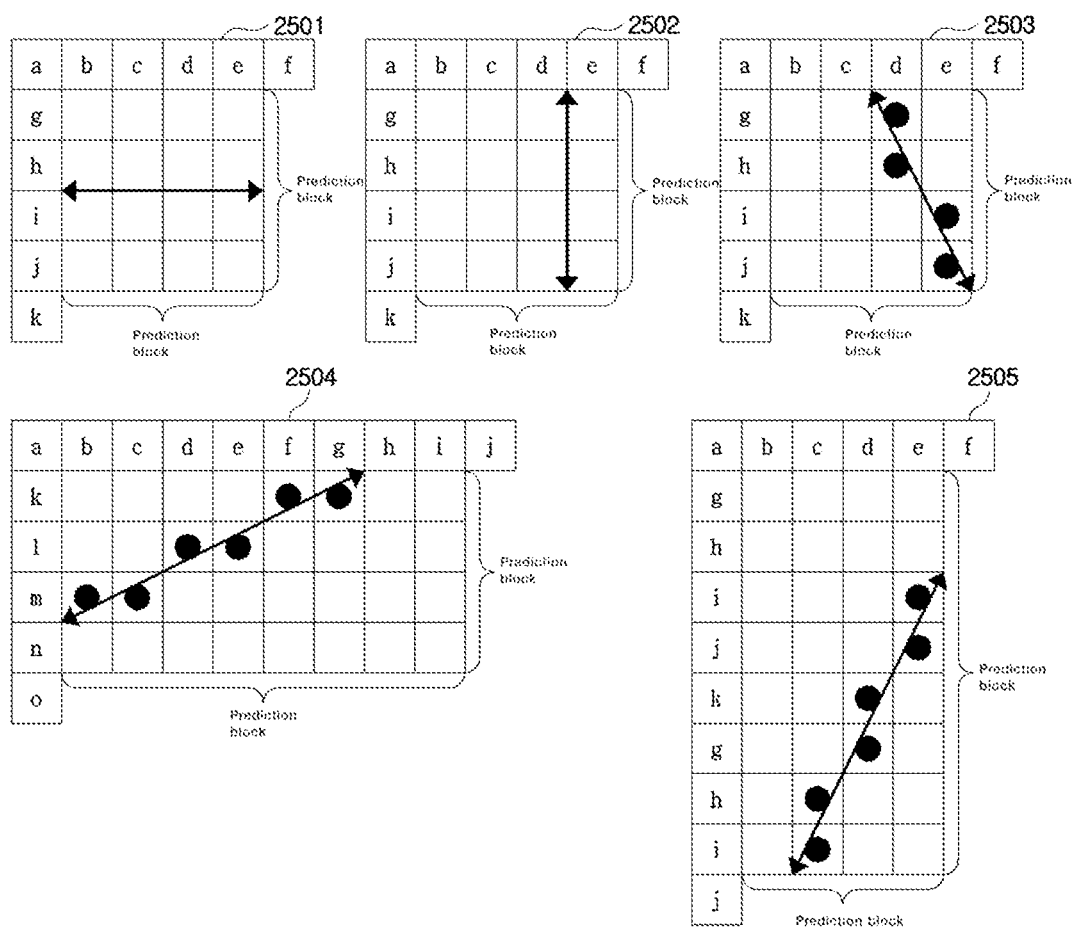
FIG. 25 is a diagram illustrating an example in which overlap regions occur according to a division shape of a current coding block.

For example, FIG. 25 is a diagram illustrating an example in which overlap regions occur according to the division shape of the current coding block.

In the case of blocks 2501 and 2502 shown in FIG. 25, the division lines correspond to the pixel boundaries, so that overlap regions between partial blocks do not occur. However, in the case of blocks 2503 to 2505, there are portions (namely, portions that pass through pixels) in which the division lines do not correspond to the pixel boundaries, and overlapped pixels (namely, overlap regions) between partial blocks are present.

As described above, when the overlap region between the partial blocks is present, the prediction value of the pixel included in the overlap region is obtained from an average of prediction values generated as the result of intra prediction of the partial blocks including the overlap region, from linear interpolation of the prediction values, or the like. For example, assuming that the current coding block is divided into a first partial block and a second partial block, the prediction value of the pixel included in the first partial block and the second partial block in a common manner is determined to be an average value of a first prediction value, which is calculated using the intra prediction mode of the first partial block, and a second prediction value, which is calculated using the intra prediction mode of the second partial block, or to be a value obtained by linearly interpolating the first prediction value and the second prediction value.

As another example, the prediction value of the pixel included in the overlap region may be generated using the intra prediction mode of one of the partial blocks including the overlap region. Here, among the partial blocks, the intra prediction mode of which block to be used may be determined on the basis of a priority preset between partial blocks, a priority preset between intra prediction modes, the position of the pixel included in the overlap region, or the like. For example, the prediction value of the pixel included in the overlap region may be generated using one with a high priority among the intra prediction modes of the partial blocks including the overlap region.

Next, in the apparatus for encoding, a method of encoding multiple intra prediction modes for current coding block will be described.

Figure 26:
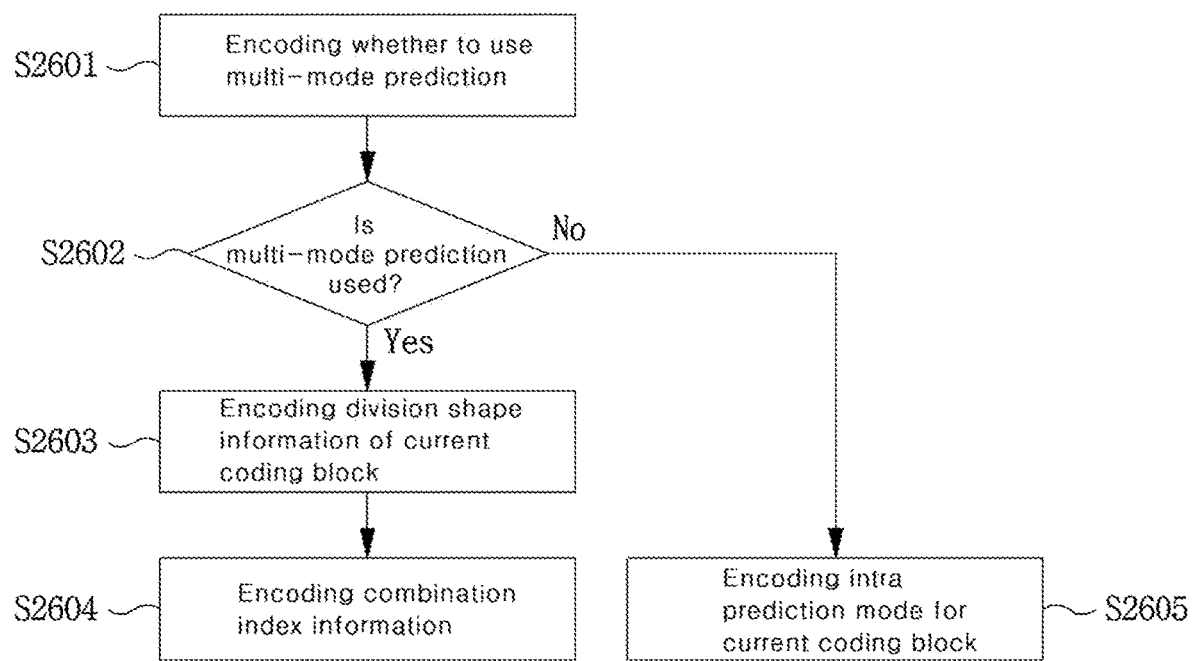
FIG. 26 is a flowchart illustrating a method of encoding multiple intra prediction modes for a current coding block.

FIG. 26 is a flowchart illustrating a method of encoding multiple intra prediction modes for a current coding block.

In the embodiment, the apparatus for encoding may generate combined index information by combining pieces of index information for identifying the intra prediction mode of each partial block.

For example, FIG. 27 is a diagram illustrating an example of generating combined index information.

Assuming that the current coding block is divided into two partial blocks, in FIG. 27, the intra prediction mode 1 indicates the intra prediction mode of the first partial block and the second intra prediction mode indicates the intra prediction mode of the second partial block. Here, the first partial block and the second partial block may be divided according to the encoding/decoding order, and may be determined on the basis of whether a pixel at a predetermined position is included, whether it is close to the pixel at a predetermined position, or the like. For example, the first partial block may be a partial block including the top left pixel of the current coding block.

Assuming that the first partial block and the second partial block are capable of using N intra prediction modes (for example, the first partial block may use intra prediction modes A1 to A(N−1), and the second partial block may use intra prediction modes B1 to B(N−1)), combination index information may indicate a combination of one among the intra prediction modes that the first partial block may use and one among the intra prediction modes that the second partial block may use. For example, the index 1 may indicate that the intra prediction mode of the first partial block is A1 and the intra prediction mode of the second partial block is B1.

In FIG. 27, described is that N combination indexes in which A1 to A(N−1) and B1 to B(N−1) are combined are used, but more combination indexes may be used or fewer combination indexes may be used. In constructing combination indexes, the prediction mode with high use frequency, such as the non-directional prediction mode, the vertical direction prediction mode, the horizontal direction prediction mode, or the like, is assigned to low index information, and the prediction mode with low use frequency, such as the directional prediction mode, or the like, is assigned to high index information.

Referring to FIG. 26, first, the apparatus for encoding encodes information indicating whether multi-mode prediction is used on the current coding block at step S2601. Here, the information may be a one-bit flag, but it is not limited thereto. The information indicates whether it is optimum to use a single intra prediction mode or multiple intra prediction modes for the current coding block.

When multi-mode prediction is used on the current coding block at step S2602, information indicating the division shape optimum for the current coding block is encoded at step S2603.

Also, the apparatus for encoding encodes the combination index information indicating the optimum intra prediction mode assigned to each partial block at step S2604.

When multi-mode prediction is not used on the current coding block at step S2602, the apparatus for encoding encodes the intra prediction mode for the current coding block at step S2605.

The intra prediction mode on the current coding block may be encoded using the MPM candidates for the current coding block. The encoding of the intra prediction mode of the current coding block using the MPM candidates has been described in detail with reference to FIGS. 17 and 18, so that the description thereof will be omitted.

FIG. 28 is a flowchart illustrating a method of decoding multiple intra prediction modes for a current coding block.

First, the apparatus for decoding decodes information indicating whether multi-mode prediction is used on the current decoding block at step S2801. Here, the information may be a one-bit flag, but it is not limited thereto. The information indicates whether it is optimum to use a single intra prediction mode or multiple intra prediction modes for the current decoding block.

When the information indicates that multi-mode prediction is used on the current decoding block (for example, the flag indicates "true") at step S2802, the information indicating the division shape optimum for the current decoding block is decoded at step S2803.

Also, the apparatus for decoding may decode the combination index information indicating the optimum intra prediction mode assigned for each partial block at step S2804.

When the combination index information is decoded, the apparatus for decoding assigns the multiple intra prediction modes specified by the combination index information to respective partial blocks.

Alternatively, when the information indicates that multi-mode prediction is not used on the current decoding block (for example, the flag indicates "false") at step S2802, the apparatus for decoding decodes the intra prediction mode for the current decoding block at step S2805.

The intra prediction mode for the current decoding block may be decoded using the MPM candidates for the current decoding block. The decoding of the intra prediction mode of the current decoding block using the MPM candidates has been described in detail with reference to FIGS. 18 and 22, so that the description thereof will be omitted.

In FIGS. 26 and 28, described is that the multiple intra prediction modes are encoded/decoded through the combination index. As another example, encoding/decoding of the multiple intra prediction modes may be performed through encoding/decoding of the intra prediction mode of each partial block. Hereinafter, another embodiment of encoding/decoding the multiple intra prediction modes will be described in detail.

Figure 29:
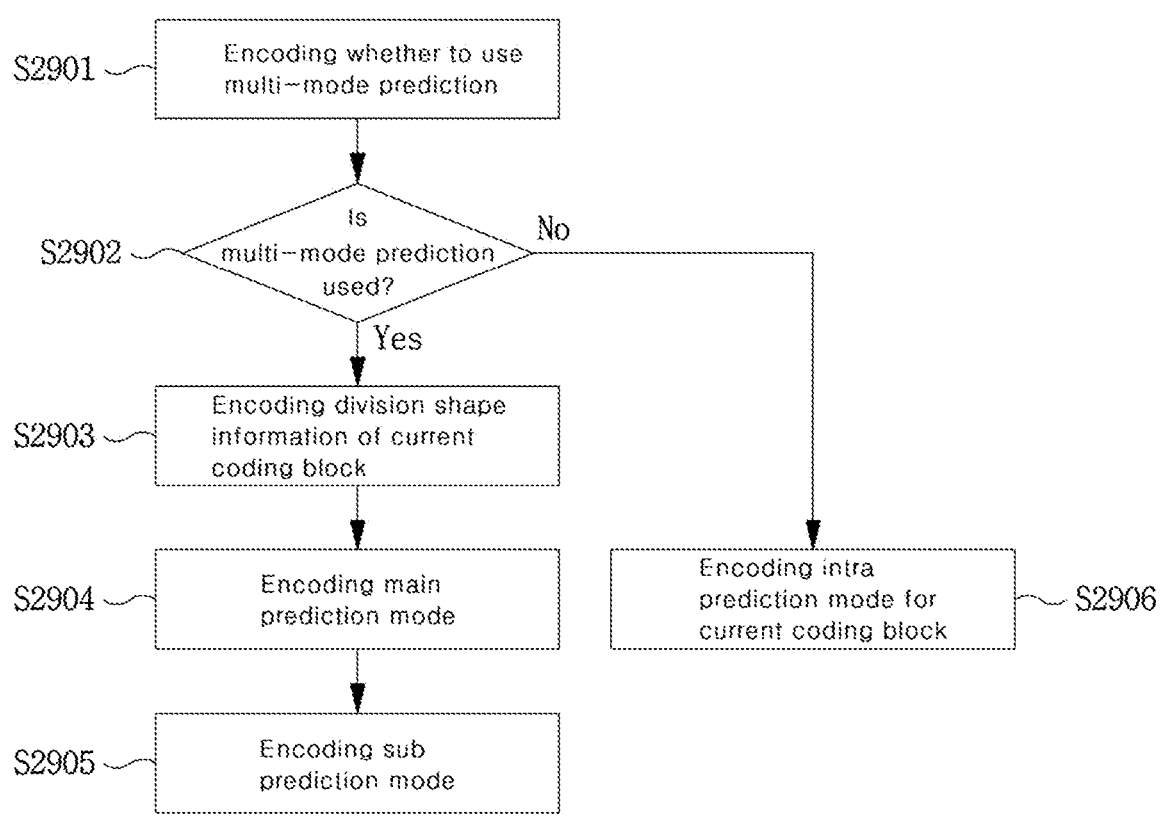
FIG. 29 is another flowchart illustrating a process of encoding multiple intra prediction modes.

FIG. 29 is another flowchart illustrating a process of encoding multiple intra prediction modes. For convenience of description, in the embodiment, the intra prediction modes of respective partial blocks are referred to as a main prediction mode and a sub prediction mode. Here, the terms the main prediction mode and the sub prediction mode are used for convenience of identifying the intra prediction modes of respective partial blocks.

Alternatively, the main prediction mode and the sub prediction mode are determined by taking the size of the partial block, the position of the partial block, the shape of the partial block, the intra prediction modes of the partial blocks, or the like, into consideration. For example, assuming that the current coding block is divided into two blocks, the intra prediction mode of the larger one of the partial blocks is referred to as the main prediction mode and the intra prediction mode of the other partial block is referred to as the sub prediction mode.

Also, the partial block using the main prediction mode is referred to as a main partial block, and the partial block using the sub prediction mode is referred to as a sub partial block.

Referring to FIG. 29, first, the apparatus for encoding encodes information indicating whether multi-mode prediction is used on the current coding block at step S2901. Here, the information may be a one-bit flag, but it is not limited thereto. The information indicates whether it is optimum to use the single intra prediction mode or the multiple intra prediction modes for the current coding block.

When multi-mode prediction is used on the current coding block at step S2902, information indicating the division shape optimum for the current coding block is encoded at step S2903.

Also, the apparatus for encoding may encode the main prediction mode at step S2904. Here, the main prediction mode may be encoded using the MPM candidates. The method of using the MPM candidates is as described with reference to FIG. 18. Here, the neighboring blocks used to set the MPM candidates may be determined on the basis of the position of the current coding block or the position of the main partial block. As another example, the apparatus for encoding may encode the main prediction mode as it is.

Next, the apparatus for encoding encodes the sub prediction mode at step S2905. For example, the apparatus for encoding may encode the index information specifying the sub prediction mode. Here, the apparatus for encoding may reassign the index to each intra prediction mode available for the sub partial block by taking the main prediction mode into consideration. Specifically, since there is high likelihood that prediction modes between partial blocks are similar to each other, the apparatus for encoding reassigns indexes to intra prediction modes available for the sub prediction block in the order of the highest probability of being selected as the sub prediction mode, when taking the main prediction mode into consideration.

Figures 30, 31:
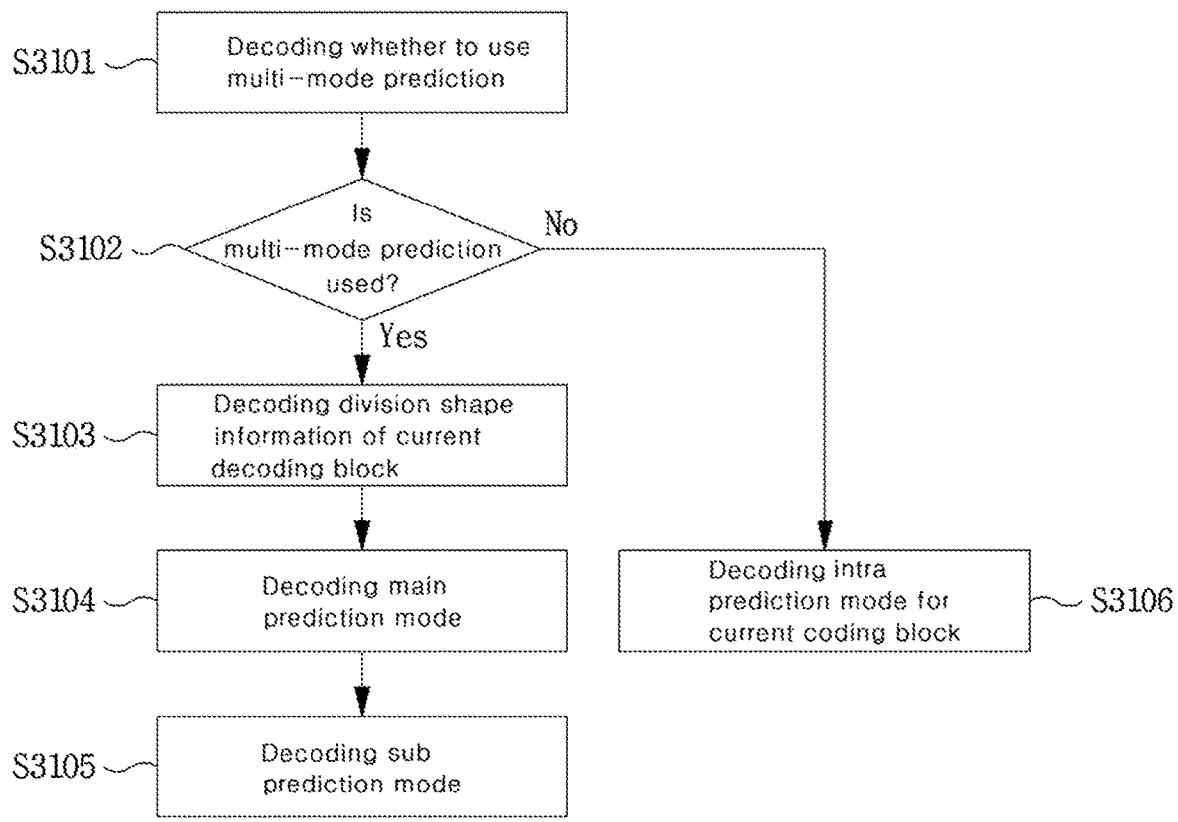
FIG. 30 is a diagram illustrating an example of reassigning indexes to intra prediction modes available for a sub prediction block.
FIG. 31 is still another flowchart illustrating a process of decoding multiple intra prediction modes.

For example, FIG. 30 is a diagram illustrating an example of reassigning the indexes to the intra prediction modes available for the sub prediction block. As shown in the example in FIG. 30, the apparatus for encoding may assign indexes of 0 to N−1 to the intra prediction modes A0 to A(N−1). The apparatus for encoding and the apparatus for decoding may reassign the indexes of the intra prediction modes with the same rule.

The prediction modes assigned to respective sub prediction mode candidates A0 to A(N−1) may vary according to the main prediction mode. For example, when the main prediction mode is the non-directional mode, there is high likelihood that the sub prediction mode is also selected as the non-directional prediction mode. Accordingly, the apparatus for encoding may assign the non-directional prediction mode to the low index and may assign the directional prediction mode to the high index.

Conversely, when the main prediction mode is the directional mode, there is high likelihood that the sub prediction mode is also selected as the directional prediction mode. Accordingly, the apparatus for encoding may assign the main prediction mode or the intra prediction mode similar to the main prediction mode to the low index, and may assign the remaining directional prediction modes and the non-directional prediction mode to the high index.

As another example, similar to the main prediction mode, the sub prediction mode may also be encoded using the MPM candidates or the sub prediction mode may be encoded as it is. Alternatively, the apparatus for encoding may encode a difference value between the main prediction mode and the sub prediction mode. In this case, the apparatus for decoding may decode the sub prediction mode using the main prediction mode and the difference value.

When multi-mode prediction is not used on the current coding block at step S2902, the apparatus for encoding may encode the intra prediction mode for the current coding block at step S2906.

The intra prediction mode for the current coding block may be encoded using the MPM candidates for the current coding block. The encoding of the intra prediction mode of the current coding block using the MPM candidates has been described in detail with reference to FIGS. 17 and 18, so that the description thereof will be omitted.

FIG. 31 is still another flowchart illustrating a process of decoding multiple intra prediction modes.

First, the apparatus for decoding decodes information indicating whether multi-mode prediction is used on the current decoding block at step S3101. Here, the information may be a one-bit flag, but it is not limited thereto. The information indicates whether it is optimum to use a single intra prediction mode or multiple intra prediction modes for the current decoding block.

When multi-mode prediction is used on the current decoding block at step S3102, information indicating the division shape optimum for the current decoding block is decoded at step S3103.

Also, the apparatus for decoding decodes the main prediction mode at step S3104. Here, the main prediction mode may be decoded using the MPM candidates. The method of using the MPM candidates is as described with reference to FIG. 18. Here, the neighboring blocks used to set the MPM candidates may be determined on the basis of the position of the current decoding block or the position of the main partial block. As another example, the information to be decoded from the bitstream may be the main prediction mode encoded as it is.

Next, the apparatus for decoding may decode the sub prediction mode at step S3105. For example, the apparatus for decoding may decode the index specifying the sub prediction mode. Here, the apparatus for decoding may reassign the index to each intra prediction mode available for the sub partial block by taking the main prediction mode into consideration. Specifically, since there is high likelihood that prediction modes between partial blocks are similar to each other, the apparatus for decoding reassigns the indexes to the intra prediction modes available for the sub prediction block in the order of the highest probability of being selected as the sub prediction mode, when taking the main prediction mode into consideration. This has been described with reference to FIG. 30, and thus the detailed description will be omitted.

As another example, similar to the main prediction mode, the sub prediction mode may also be decoded using the MPM candidates. Alternatively, the information to be decoded from the bitstream may indicate the sub prediction mode as it is. Alternatively, the apparatus for decoding may decode the difference value between the main prediction mode and the sub prediction mode. In this case, the apparatus for decoding may decode the sub prediction mode using the main prediction mode and the difference value.

When multi-mode prediction is not used on the current decoding block at step S3102, the apparatus for decoding decodes the intra prediction mode for the current decoding block at step S3106.

The intra prediction mode for the current decoding block may be decoded using the MPM candidates for the current decoding block. The decoding of the intra prediction mode of the current decoding block using the MPM candidates has been described in detail with reference to FIGS. 18 and 22, so that the description thereof will be omitted.

Although exemplary methods of the present invention are represented as a series of operations for clarity of description, the order of the steps is not limited thereto. When necessary, the illustrated steps may be performed simultaneously or in a different order. In order to realize the method according to the present invention, other steps may be added to the illustrative steps, some steps may be excluded from the illustrative steps, or some steps may be excluded while additional steps may be included.

The various embodiments of the present invention are not intended to list all possible combinations, but to illustrate representative aspects of the present invention. The matters described in the various embodiments may be applied independently or in a combination of two or more.

Also, the various embodiments of the present invention may be implemented by hardware, firmware, software, or a combination thereof. With hardware implementation, the embodiment may be implemented by using at least one selected from a group of application specific integrated circuits (ASICs), digital signal processors (DSPs), digital signal processing devices (DSPDs), programmable logic devices (PLDs), field programmable gate arrays (FPGAs), general-purpose processors, controllers, micro controllers, micro processors, etc.

The scope of the present invention includes software or machine-executable instructions (e.g., an operating system, an application, firmware, a program, etc.) that cause operation according to the methods of the various embodiments to be performed on a device or a computer, and includes a non-transitory computer-readable medium storing such software or instructions to execute on a device or a computer.

INDUSTRIAL APPLICABILITY

The present invention may be used in encoding/decoding an image.

The invention claimed is:
1. An image decoding method, comprising:
determining an intra prediction mode of a current block;
generating a prediction block of the current block based on the intra prediction mode; and
reconstructing the current block based on the prediction block,
wherein the determining the intra prediction mode of the current block comprises
deriving a ratio of a width and a height of the current block;
determining whether the width is not equal to the height; and
when the width is not equal to the height and the intra prediction mode of the current block is within an intra prediction mode range determined based on the ratio, modifying the intra prediction mode of the current block into an intra prediction mode applicable to the current block based on the ratio,
wherein the modified intra prediction mode is used to generate the prediction block,
wherein, when the height is longer than the width, a quantity of horizontal directional intra prediction modes applicable to the current block is greater than a quantity of vertical directional intra prediction modes applicable to the current block, wherein, when the height is at least two times longer than the width, the quantity of horizontal directional intra predication modes is at least two times larger than the quantity of vertical directional intra prediction modes, and wherein the intra prediction mode range in a horizontal direction increases as the ratio increases.

2. The method of claim 1, wherein increments of the quantity of the horizontal directional intra prediction modes applicable to the current block is decrements of the quantity of the vertical directional intra prediction modes applicable to the current block in comparison with a quantity of horizontal directional intra prediction modes and a quantity of vertical directional intra prediction modes applicable to a square block.

3. The method of claim 2, wherein the increments and decrements are determined based on the ratio.

4. An image encoding method, comprising:

determining an intra prediction mode of a current block;

generating a prediction block of the current block based on the intra prediction mode;

encoding the current block based on the prediction block; and encoding the intra prediction mode of the current block, wherein the encoding the intra prediction mode of the current block comprises deriving a ratio of a width and a height of the current block;

determining whether the width is not equal to the height; and when the width is not equal to the height and the intra prediction mode of the current block is within an intra prediction mode range determined based on the ratio, modifying the intra prediction mode of the current block into an intra prediction mode applicable to the current block based on the ratio, wherein, when the height is longer than the width, a quantity of horizontal directional intra prediction modes applicable to the current block is greater than a quantity of vertical directional intra prediction modes applicable to the current block, wherein, when the height is at least two times longer than the width, the quantity of horizontal directional intra predication modes is at least two times larger than the quantity of vertical directional intra prediction modes, and wherein the intra prediction mode range in a horizontal direction increases as the ratio increases.

5. A non-transitory computer readable recording medium storing a bitstream which is received, decoded and used to reconstruct an image by an image decoding apparatus, the bitstream comprises information on prediction of a current block, wherein the information on prediction is used to determine an intra prediction mode of the current block, the intra prediction mode is used to generate a prediction block of the current block, the prediction block is used to reconstruct the current block, and wherein to determine the intra prediction mode of the current block comprises deriving a ratio of a width and a height of the current block;

determining whether the width is not equal to the height; and when the width is not equal to the height and the intra prediction mode of the current block is within an intra prediction mode range determined based on the ratio, modifying the intra prediction mode of the current block into an intra prediction mode applicable to the current block based on the ratio, wherein the modified intra prediction mode is used to generate the prediction block, wherein, when the height is longer than the width, a quantity of horizontal directional intra prediction modes applicable to the current block is greater than a quantity of vertical directional intra prediction modes applicable to the current block, wherein, when the height is at least two times longer than the width, the quantity of horizontal directional intra predication modes is at least two times larger than the quantity of vertical directional intra prediction modes, and wherein the intra prediction mode range in a horizontal direction increases as the ratio increases.

\* \* \* \* \*